US012611865B2

(12) United States Patent
Inoue

(10) Patent No.: US 12,611,865 B2
(45) Date of Patent: Apr. 28, 2026

(54) CAP DEVICE, CAPPING METHOD, AND LIQUID JET SYSTEM

(71) Applicant: FUJIFILM Corporation, Tokyo (JP)

(72) Inventor: Takahiro Inoue, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 154 days.

(21) Appl. No.: 18/677,811

(22) Filed: May 29, 2024

(65) Prior Publication Data

US 2024/0308222 A1 Sep. 19, 2024

Related U.S. Application Data

(63) Continuation of application No. PCT/JP2022/039843, filed on Oct. 26, 2022.

(30) Foreign Application Priority Data

Dec. 2, 2021 (JP) ................................ 2021-196077

(51) Int. Cl.

| | |
|---|---|
| ***B41J 2/165*** | (2006.01) |
| ***B41J 25/304*** | (2006.01) |
| *B41J 25/00* | (2006.01) |

(52) U.S. Cl.

CPC ....... *B41J 2/16511* (2013.01); *B41J 2/16505* (2013.01); *B41J 2/16507* (2024.05);

(Continued)

(58) Field of Classification Search

CPC .......................... B41J 2/16511; B41J 25/304; B41J 2025/008; B41J 2/16505; B41J 2/16507;

(Continued)

(56) References Cited

U.S. PATENT DOCUMENTS

| | | | | |
|---|---|---|---|---|
| 5,635,965 A * | 6/1997 | Purwins | ............... | B41J 2/16511 347/31 |
| 6,540,323 B1 * | 4/2003 | Dowell | ................ | B41J 2/16511 347/29 |

(Continued)

FOREIGN PATENT DOCUMENTS

| | | |
|---|---|---|
| EP | 0724959 | 5/1999 |
| EP | 1332880 | 4/2005 |

(Continued)

OTHER PUBLICATIONS

"Search Report of Europe Counterpart Application", issued on Feb. 18, 2025, p. 1-p. 9.

(Continued)

*Primary Examiner* — Henok D Legesse
(74) *Attorney, Agent, or Firm* — JCIPRNET

(57) ABSTRACT

The present disclosure may suppress adhesion of a liquid to a seal member used for moisturizing a nozzle surface. A seal member that is brought into contact with a seal position of a liquid jet head, a seal member support mechanism that supports the seal member to be movable and includes a swing member that supports the seal member to be swingable about a swing shaft extending along a first direction are provided, and in a case in which the seal member is moved in a second direction and a fourth direction as the liquid jet head of which a lower surface abuts on a head abutting position defined in the swing member moves in a third direction, the seal member is moved in a fourth direction by a distance, which is at least twice a moving distance in the second direction, and separated from the seal position.

13 Claims, 22 Drawing Sheets

(52) U.S. Cl.
CPC ....... *B41J 2/16526* (2013.01); *B41J 2/16585* (2013.01); *B41J 25/304* (2013.01); *B41J 2/16517* (2013.01); *B41J 2025/008* (2013.01)

(58) Field of Classification Search
CPC . B41J 2/16517; B41J 2/16526; B41J 2/16585
See application file for complete search history.

(56) References Cited

U.S. PATENT DOCUMENTS

| | | | | |
|---|---|---|---|---|
| 8,419,162 | B2 * | 4/2013 | Sakano | B41J 2/16508 347/29 |
| 10,457,052 | B2 * | 10/2019 | Tsubaki | B41J 2/16585 |
| 2003/0081048 | A1 | 5/2003 | Davis et al. | |
| 2009/0058927 | A1 * | 3/2009 | Okada | B41J 2/16585 347/33 |
| 2013/0241992 | A1 * | 9/2013 | Shimizu | B41J 2/16585 347/29 |
| 2020/0254766 | A1 * | 8/2020 | Hoover | B41J 2/16552 |
| 2021/0206170 | A1 | 7/2021 | Kobayashi et al. | |

FOREIGN PATENT DOCUMENTS

| | | | | |
|---|---|---|---|---|
| EP | 1827839 | | 2/2009 | |
| EP | 1827839 | B1 * | 2/2009 | B41J 2/16588 |
| JP | 2002144593 | | 5/2002 | |
| JP | 2002144593 | A * | 5/2002 | B41J 2/01 |
| JP | 2012011747 | | 1/2012 | |
| JP | 2021059013 | | 4/2021 | |
| JP | 2021109331 | | 8/2021 | |
| WO | WO-2019150803 | A1 * | 8/2019 | B41J 2/165 |

OTHER PUBLICATIONS

"International Search Report (Form PCT/ISA/210) of PCT/JP2022/039843," mailed on Dec. 6, 2022, with English translation thereof, pp. 1-5.

"Written Opinion of the International Searching Authority (Form PCT/ISA/237) of PCT/JP2022/039843," mailed on Dec. 6, 2022, with English translation thereof, pp. 1-6.

* cited by examiner

CAP DEVICE, CAPPING METHOD, AND LIQUID JET SYSTEM

CROSS-REFERENCE TO RELATED APPLICATIONS

The present application is a Continuation of PCT International Application No. PCT/JP2022/039843 filed on Oct. 26, 2022 claiming priority under 35 U.S.C § 119(a) to Japanese Patent Application No. 2021-196077 filed on Dec. 2, 2021. Each of the above applications is hereby expressly incorporated by reference, in its entirety, into the present application.

BACKGROUND OF THE INVENTION

1. Field of the Invention

The present invention relates to a cap device, a capping method, and a liquid jet system.

2. Description of the Related Art

In a liquid jet head using an ink jet method, in a case in which a nozzle surface on which a nozzle opening is formed is dried, there is a concern that a jet abnormality of a nozzle occurs due to a decrease in jet performance of the nozzle. In a liquid jet system comprising the liquid jet head, capping of the nozzle surface is performed in order to suppress drying of the nozzle surface.

For example, the nozzle surface is brought close to a moisturizing solution reserved inside a cap, a seal member is brought into contact with a side surface of the liquid jet head to hermetically seal the moisturizing solution and the nozzle surface in the same space, and the nozzle surface is moisturized by the moisturizing solution.

On the other hand, in a case in which the cap is used as a liquid receiver and the liquid jet head is purged, the nozzle surface is separated from the cap in order to suppress the adhesion of a mist-like liquid generated during the purge to the nozzle surface.

JP2021-59013A discloses a capping device that moisturizes a nozzle surface of an ink jet head. In the device disclosed in JP2021-59013A, in a case in which an arm with the abutting nozzle surface in accordance with the lowering of the nozzle surface is pushed downward in accordance with the lowering of the ink jet head, the arm and an elastic member rotate, and the clastic member is pressed against a side surface of the ink jet head. As a result, the side surface of the ink jet head is sealed with the clastic member.

SUMMARY OF THE INVENTION

However, in a case in which the purge is performed by jetting an ink from the nozzle surface at a purge position at a position slightly higher than a cap height representing a position of the nozzle surface in a case of moisturizing the nozzle surface, the jetted ink adheres to the nozzle surface. In a case in which the ink adhering to the nozzle surface reaches the seal member through the nozzle surface, the ink that has reached the seal member may reach the side surface of the liquid jet head. In this case, in a case in which the ink that has reached the side surface of the liquid jet head enters a gap between the liquid jet heads and is stuck, it is difficult to finely adjust a position of the liquid jet head.

For example, in the liquid jet head configured by connecting a plurality of head modules, in a case in which the ink enters a gap between adjacent head modules and is stuck, it is difficult to adjust a distance between the adjacent head modules.

In addition, in a case in which the ink that has entered the gap between the liquid jet heads and is stuck falls as a solid during liquid jetting, such as during printing, there is a concern about a decrease in a quality of a printed matter or the like and a failure of the device.

In the device disclosed in JP2021-59013A, in a case in which the ink jet head is purged in a state in which the nozzle surface is separated from the moisturizing solution, the arm is located below the nozzle surface, and the ink jetted during the purge may adhere to the arm. In this case, there is a concern that the ink adhering to the arm enters the gap between the ink jet heads and is stuck in a case in which the nozzle surface comes into contact with the arm.

The present invention has been made in view of such circumstances, and an object of the present invention is to provide a cap device, a capping method, and a liquid jet system in which adhesion of a liquid to a seal member used in a case of moisturizing a nozzle surface is suppressed.

The present disclosure relates to a cap device that caps a liquid jet head, the cap device comprising: a seal member that is brought into contact with a seal position defined on a side surface of the liquid jet head; and a seal member support mechanism that supports the seal member to be movable with respect to the side surface, the seal member support mechanism including a swing member that supports the seal member to be swingable about a swing shaft along a first direction in which the seal member extends, in which, in the swing member, a head abutting position where a lower surface of the liquid jet head, which is a surface different from a nozzle surface of the liquid jet head and faces a direction parallel to a second direction in which the nozzle surface faces, abuts is defined, and in a case in which the seal member is moved in the second direction and a fourth direction in which a normal line of the side surface faces, as the liquid jet head of which the lower surface abuts on the head abutting position moves in a third direction opposite to the second direction, the seal member is moved in the fourth direction by a distance, which is at least twice a moving distance in the second direction, and separated from the seal position.

With the cap device according to the present disclosure, in a case in which the liquid jet head is moved in the third direction opposite to the second direction in which the normal line of the nozzle surface faces, and the seal member is moved in the second direction and the fourth direction in which the normal line of the side surface of the liquid jet head faces, the moving distance of the seal member in the fourth direction is set to be at least twice the moving distance of the seal member in the third direction. As a result, the contact between the nozzle surface and the seal member can be avoided, and the adhesion of the liquid adhering to the nozzle surface to the seal member can be suppressed.

The side surface of the liquid jet head may be defined as a surface parallel to the first direction and orthogonal to the second direction. In a case in which the liquid jet head comprises the support member that supports the body, a side surface of the support member may be applied to the side surface of the liquid jet head.

As the second direction and the third direction, a direction parallel to a vertical direction may be applied, or a direction intersecting the vertical direction may be applied. Examples of the second direction include a vertical downward direction. Examples of the third direction include a vertical upward direction.

In a case in which the liquid jet heads have two side surfaces parallel to each other, the liquid jet head may comprise a seal member that is brought into contact with one side surface and a seal member that is brought into contact with the other side surface.

In the cap device according to another aspect, the swing member may move the seal member in the third direction and a fifth direction opposite to the fourth direction as the liquid jet head of which the lower surface abuts on the head abutting position moves in the second direction, to bring the seal member into contact with the seal position.

According to such an aspect, the swing member can be pressed by using the liquid jet head that moves in the second direction to swing the seal member.

In the cap device according to still another aspect, the seal member support mechanism may include a biasing member that biases the swing member in the third direction.

According to such an aspect, the biasing force directed in the third direction can be applied to the swing member in a case in which the liquid jet head is moved in the third direction.

In the cap device according to still another aspect, the third direction may have a component in a vertical upward direction, and a distal end of the seal member may be located at a highest position in a case in which the seal member is brought into contact with the seal position.

According to such an aspect, the seal member comes into contact with a position on an upper side of the nozzle surface in a case in which the liquid jet head is moisturized. As a result, the adhesion of the liquid adhering to the nozzle surface to the seal member can be suppressed.

In the cap device according to still another aspect, the swing member may support at least any one of one end or the other end of the seal member in the first direction.

In such an aspect, an aspect is preferable in which the seal member includes the swing member at each of both ends in the first direction.

In the cap device according to still another aspect, the seal member support mechanism may include a rotation member that is rotatably supported by the swing member, and the rotation member may be disposed at a position abutting on the lower surface of the liquid jet head at the head abutting position.

According to such an aspect, wear of the lower surface of the liquid jet head can be suppressed.

In the cap device according to still another aspect, the seal member support mechanism may include a plate-shaped member having an abutting surface that abuts on the lower surface of the liquid jet head at the head abutting position.

According to such an aspect, the lower surface of the liquid jet head is in surface contact with the swingable member. As a result, partial wear of the lower surface of the liquid jet head can be suppressed.

In the cap device according to still another aspect, the lower surface may be formed with at least any one of a protruding portion or a recess portion, and the abutting surface may be formed with at least any one of a recess portion corresponding to the protruding portion formed on the lower surface or a protruding portion corresponding to the recess portion formed on the lower surface.

According to such an aspect, the accuracy of the positioning between the cap device and the liquid jet head can be improved.

The present disclosure relates to a capping method of capping a liquid jet head, the capping method comprising: via a cap device including a seal member that is brought into contact with a seal position defined on a side surface of the liquid jet head, and a seal member support mechanism that supports the seal member to be movable with respect to the side surface, the seal member support mechanism including a swing member that supports the seal member to be swingable about a swing shaft along a first direction in which the seal member extends, in which a head abutting position where a lower surface of the liquid jet head, which is a surface different from a nozzle surface of the liquid jet head and faces a direction parallel to a second direction in which the nozzle surface faces, abuts is defined in the swing member, moving, in a case in which the seal member is moved in the second direction and a fourth direction in which a normal line of the side surface faces as the liquid jet head of which the lower surface abuts on the head abutting position moves in a third direction opposite to the second direction, the seal member in the fourth direction by a distance, which is at least twice a moving distance in the second direction, to separate the seal member from the seal position.

With the capping method according to the present disclosure, the same effects as the effects of the cap device according to the present disclosure can be obtained. The configuration requirements of the cap device according to the other aspects may be applied to configuration requirements of the capping method according to still another aspect.

The present disclosure relates to a liquid jet system comprising: a liquid jet head; and a cap device that caps the liquid jet head, in which the cap device includes a seal member that is brought into contact with a seal position defined on a side surface of the liquid jet head, and a seal member support mechanism that supports the seal member to be movable with respect to the side surface, the seal member support mechanism including a swing member that supports the seal member to be swingable about a swing shaft along a first direction in which the seal member extends, and in the swing member, a head abutting position where a lower surface of the liquid jet head, which is a surface different from a nozzle surface of the liquid jet head and faces a direction parallel to a second direction in which the nozzle surface faces, abuts is defined, and in a case in which the seal member is moved in the second direction and a fourth direction in which a normal line of the side surface faces, as the liquid jet head of which the lower surface abuts on the head abutting position moves in a third direction opposite to the second direction, the seal member is moved in the fourth direction by a distance, which is at least twice a moving distance in the second direction, and separated from the seal position.

With the liquid jet system according to the present disclosure, the same effects as the effects of the cap device according to the present disclosure can be obtained. The configuration requirements of the cap device according to the other aspect may be applied to configuration requirements of the liquid jet system according to still another aspect.

The liquid jet system according to still another aspect may further comprise a head lifting/lowering device that lifts and lowers the liquid jet head along the second direction and the third direction, in which the head lifting/lowering device lifts and lowers the liquid jet head between a cap position at which the nozzle surface of the liquid jet head is moisturized and a purge position at which the liquid jet head is purged and at which a distance from the head abutting position is longer than a distance from the head abutting position at the cap position.

According to such an aspect, the lowering of the liquid jet head from the purge position to the cap position and the lifting of the liquid jet head from the cap position to the purge position can be realized.

In such an aspect, a head moving device that moves the liquid jet head from a jet position to a head maintenance position may be provided.

In the liquid jet system according to still another aspect, the lower surface of the liquid jet head may be located outside the nozzle surface in the first direction.

According to such an aspect, the contact between the seal member, the seal member support mechanism, and the nozzle surface is avoided. As a result, damage to the nozzle surface can be avoided.

In the liquid jet system according to still another aspect, the seal position may be defined at a position on a third direction side with respect to the nozzle surface.

According to such an aspect, the contact between the nozzle surface and the seal member can be avoided.

In a case in which the third direction has the component in a vertical upward direction, a position on the upper side of the nozzle surface may be a seal position.

According to the present invention, in a case in which the liquid jet head is moved in the third direction opposite to the second direction in which the normal line of the nozzle surface faces, and the seal member is moved in the second direction and the fourth direction in which the normal line of the side surface of the liquid jet head faces, the moving distance of the seal member in the fourth direction is set to be at least twice the moving distance of the seal member in the third direction. As a result, the contact between the nozzle surface and the seal member can be avoided, and the adhesion of the liquid adhering to the nozzle surface to the seal member can be suppressed.

DESCRIPTION OF THE PREFERRED EMBODIMENTS

Figure 1:
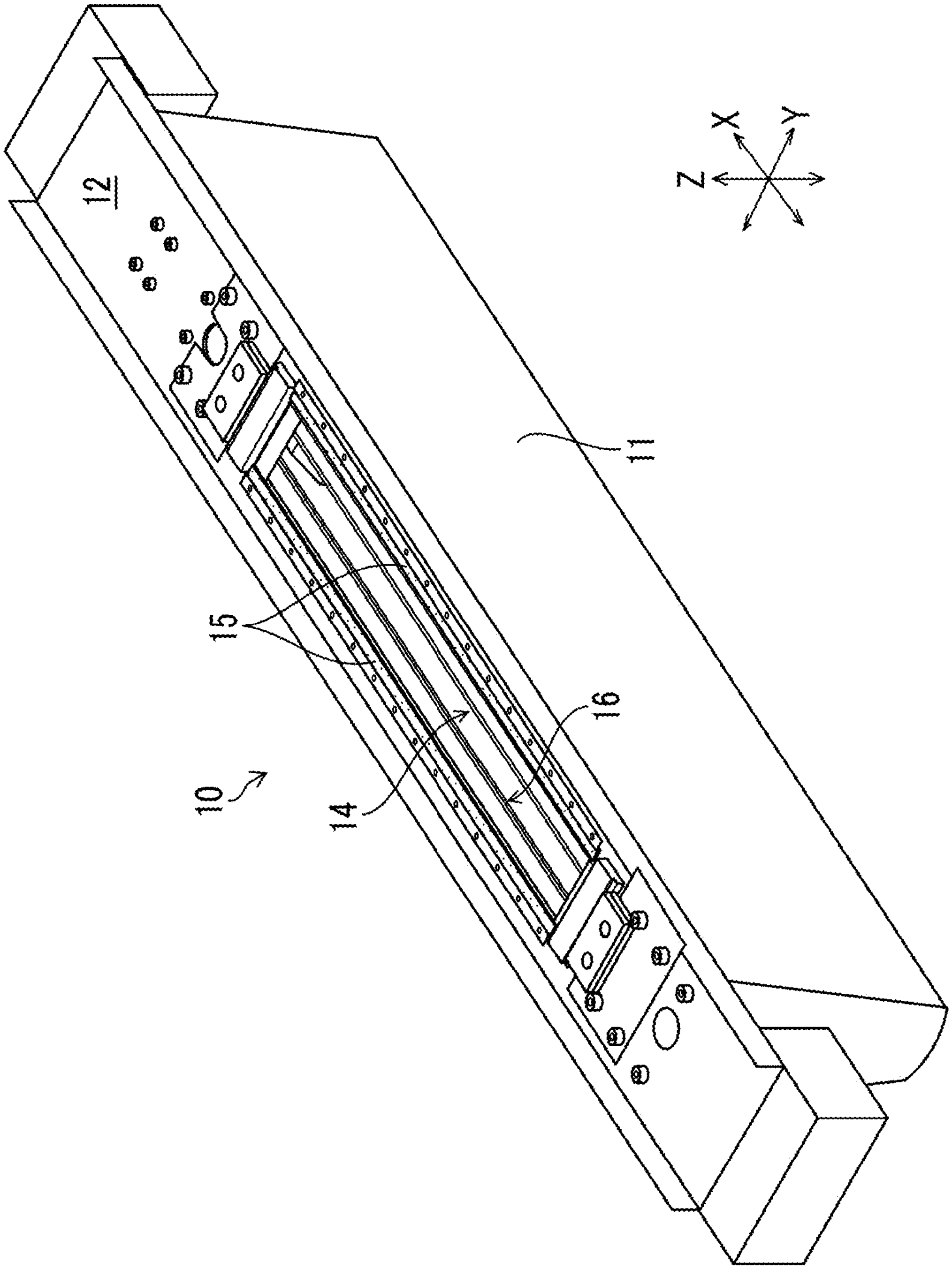
FIG. 1 is a perspective view showing an overall configuration of a cap device according to an embodiment.

Hereinafter, the detailed description of preferred embodiments of the present invention will be made with reference to the accompanying drawings. In the present specification, the same reference numeral will be given to the same configuration element and the duplicate description thereof will be omitted as appropriate.

[Configuration Example of Cap Device According to Embodiment]

Figure 2:
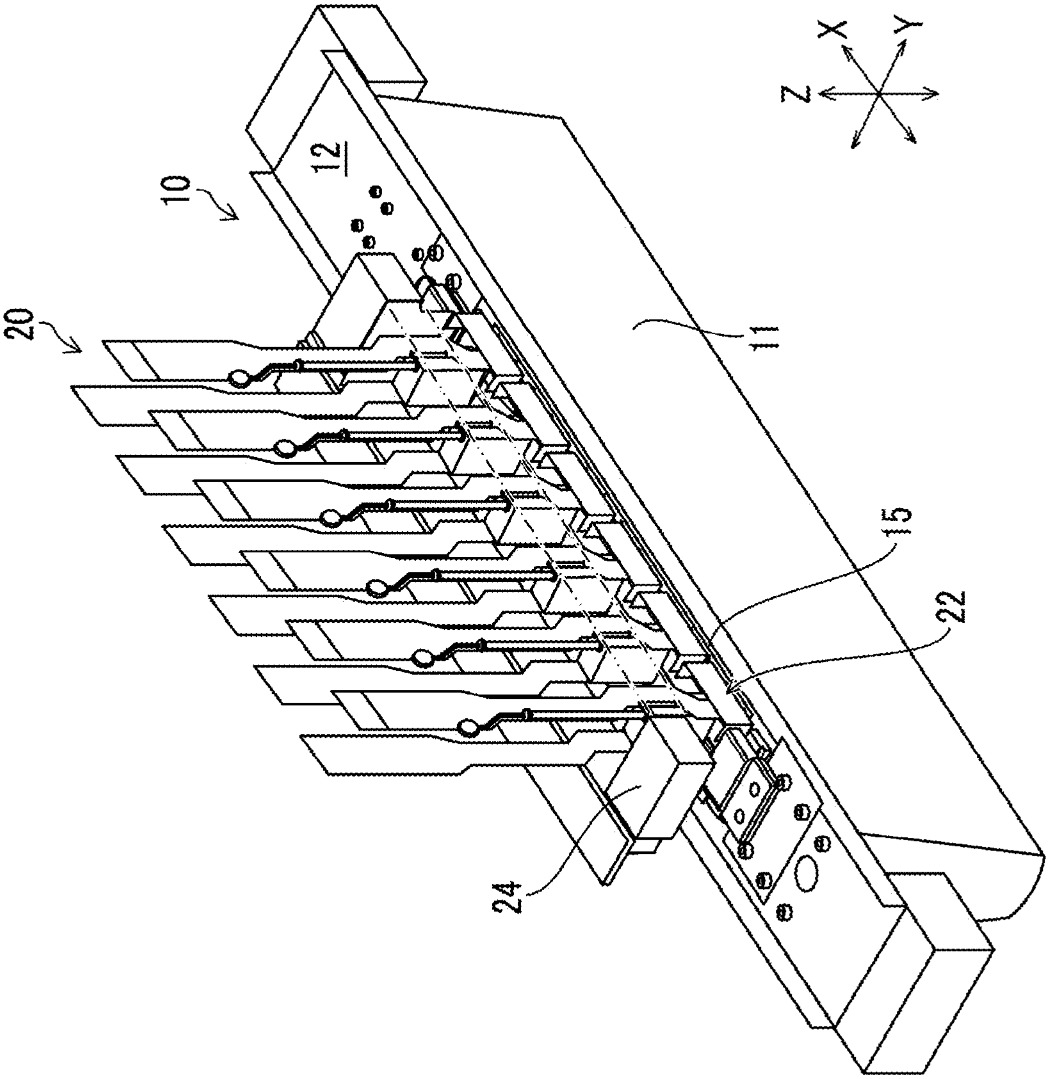
FIG. 2 is a perspective view showing a usage state of the cap device shown in FIG. 1.
Figure 4A:
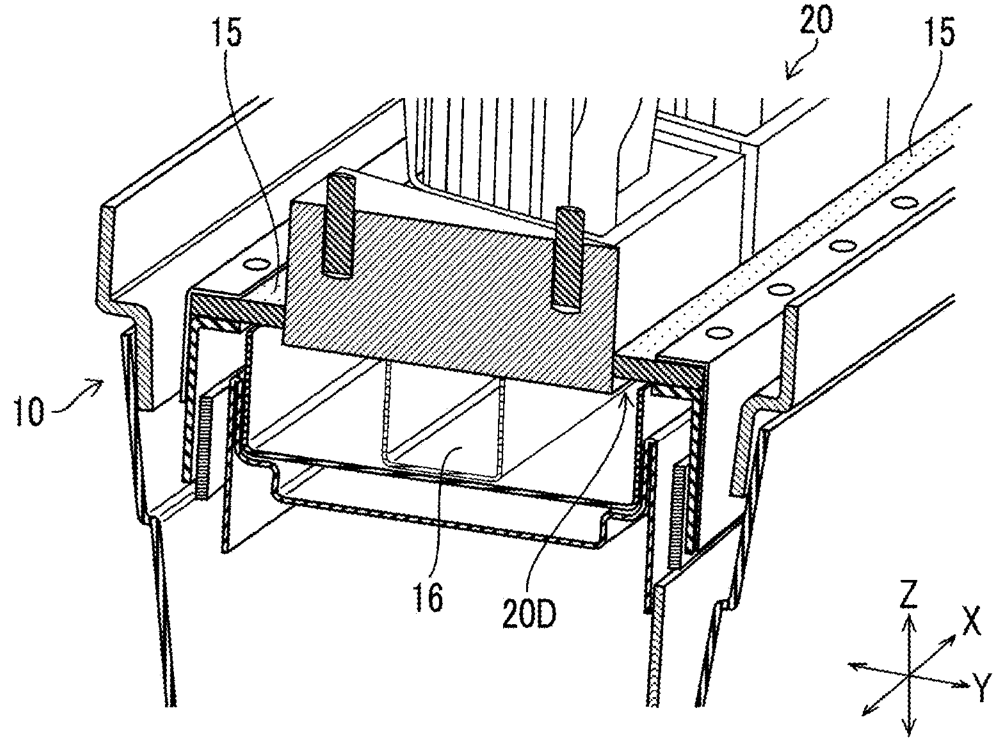
FIGS. 4A and 4B are perspective views showing a contact state and a separation state of a seal blade with respect to the liquid jet head.
Figure 4B:
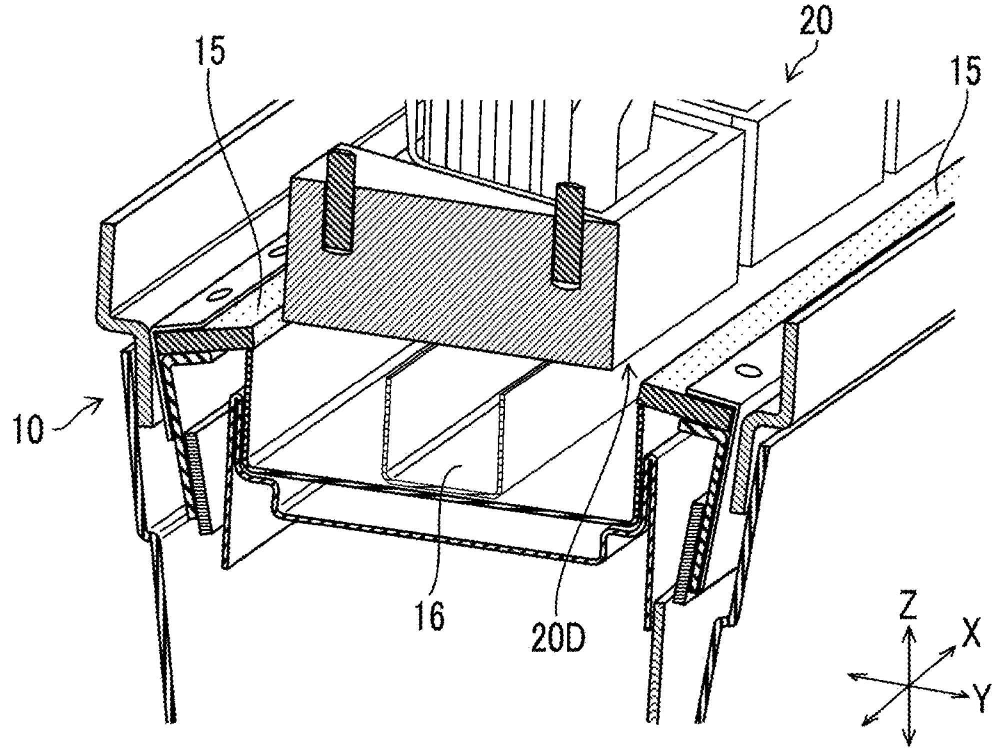

FIG. 1 is an overall configuration view showing a schematic configuration of a cap device according to the embodiment. A cap device 10 shown in FIG. 1 functions as a liquid receiver in a case of performing purge processing of a liquid jet head using a ink jet method. The cap device 10 reserves a moisturizing solution used for moisturizing a nozzle surface and seals the nozzle surface. It should be noted that the liquid jet head is shown in FIG. 2 with reference numeral 20. The nozzle surface is shown in FIGS. 4A and 4B with reference numeral 20D.

In the cap device 10, an opening 14 is formed in an upper surface 12 of a frame 11, and a seal blade 15 and a moisturizing solution reservoir 16 are disposed inside the frame 11. The cap device 10 comprises a pair of seal blades 15.

One of the pair of seal blades 15 is disposed at one end of the opening 14 in a Y direction, and the other of the pair of seal blades 15 is disposed at the other end of the opening 14 in the Y direction. Hereinafter, the term "seal blade 15" may indicate the pair of seal blades 15, or may indicate one or the other of the pair of seal blades 15.

Figure 7:
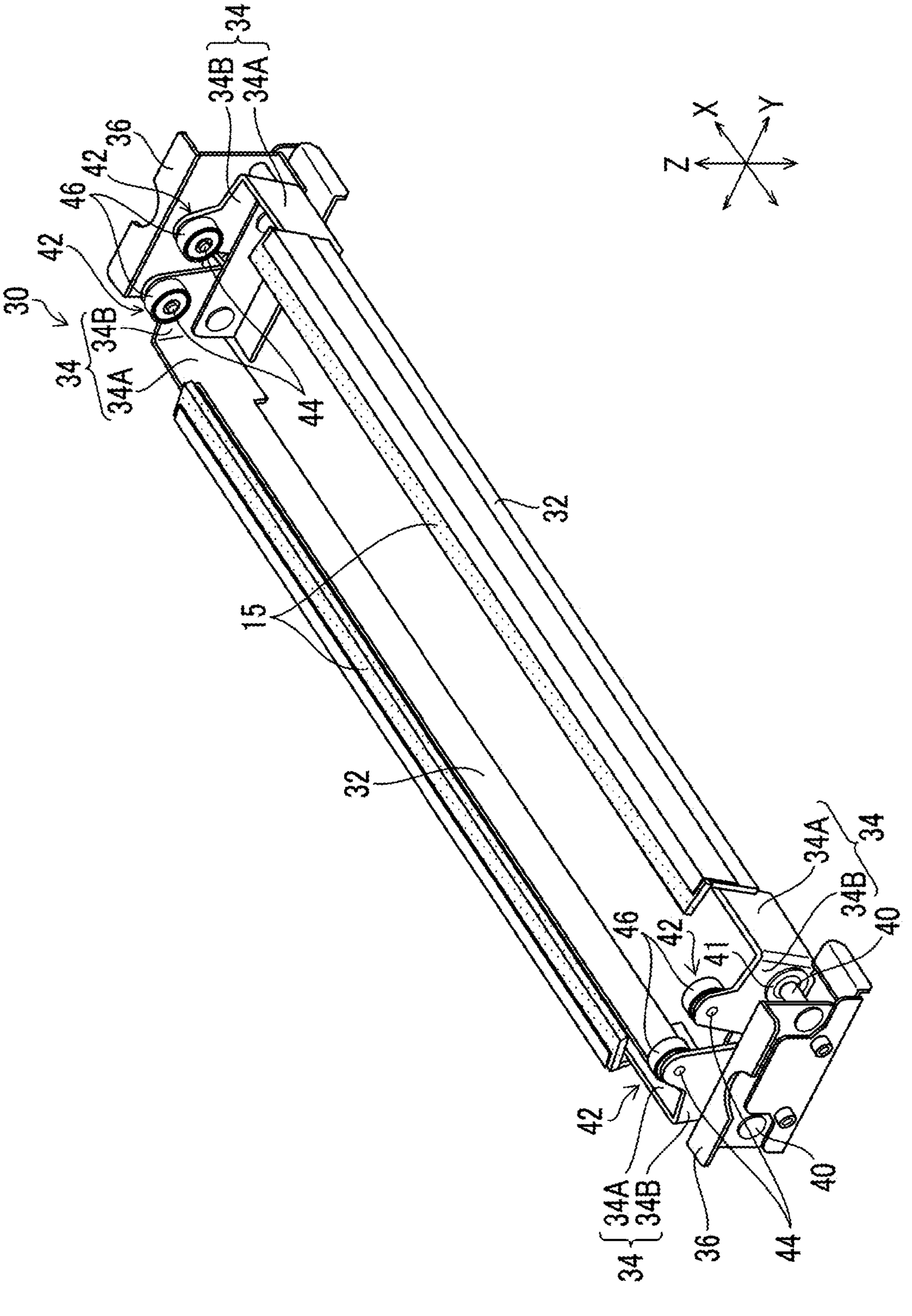
FIG. 7 is a perspective view of a seal blade moving mechanism.

The cap device 10 comprises a seal blade moving mechanism that supports the seal blade 15 to be swingable about a swing shaft extending in a direction parallel to an X direction. It should be noted that the seal blade moving mechanism is shown in FIG. 7 with reference numeral 30. The seal blade moving mechanism described in the embodiment is an example of a seal member support mechanism that supports the seal member to be movable with respect to the side surface.

Here, the X direction is a longitudinal direction of the opening 14 having a rectangular shape, and is a direction in which the seal blade 15 extends. The Y direction is a direction orthogonal to the X direction and is a lateral direction of the opening 14. A Z direction is a direction orthogonal to each of the X direction and the Y direction. It should be noted that the X direction described in the embodiment is an example of a first direction. The seal blade 15 described in the embodiment is an example of a seal member.

In addition, the term "parallel" in the present specification may include substantial parallelism that can be regarded as parallelism even in a case in which two directions strictly intersect. The term "orthogonal" includes substantial orthogonality that an angle formed by two directions can be regarded as 90° even in a case in which the angle formed by the two directions is strictly less than 90° or more than 90°.

FIG. 2 is a perspective view showing a usage state of the cap device shown in FIG. 1. FIG. 2 shows a state in which the cap device 10 is mounted on a liquid jet head 20. The liquid jet head 20 has a structure in which a plurality of head modules 22 are arranged in a row along the longitudinal direction of the liquid jet head 20. The plurality of head modules 22 are integrally supported by using a head holding housing 24. It should be noted that, in FIG. 2, a part of the head holding housing 24 is shown by a one-dot chain line, to visualize the configuration of the head module 22.

In a case in which the moisturizing processing of the liquid jet head 20 is performed in a state in which the cap device 10 is mounted on the liquid jet head 20, the nozzle surface of the liquid jet head 20 is disposed at a position equal to or less than a defined distance from a liquid level of the moisturizing solution reserved in the moisturizing solution reservoir 16, inside the frame 11. A position of the liquid jet head 20 in a case of moisturizing the nozzle surface will be referred to as a cap position.

In addition, in a case in which the purge processing of the liquid jet head 20 is performed, the nozzle surface is disposed at a position slightly away from the liquid level of the moisturizing solution as compared with a case in which the moisturizing processing of the nozzle surface of the liquid jet head 20 is performed. A position of the liquid jet head 20 in a case of performing the purge processing of the liquid jet head 20 will be referred to as a purge position. The purge position is a position in an upward direction of the Z direction with respect to the cap position.

Here, the upward direction of the Z direction is a direction opposite to a normal direction of the nozzle surface. The normal direction of the nozzle surface is a downward direction of the Z direction. It should be noted that the downward direction of the Z direction described in the embodiment is an example of a second direction. The upward direction of the Z direction described in the embodiment is an example of a third direction.

[Configuration of Liquid Jet Head]

Figure 3:
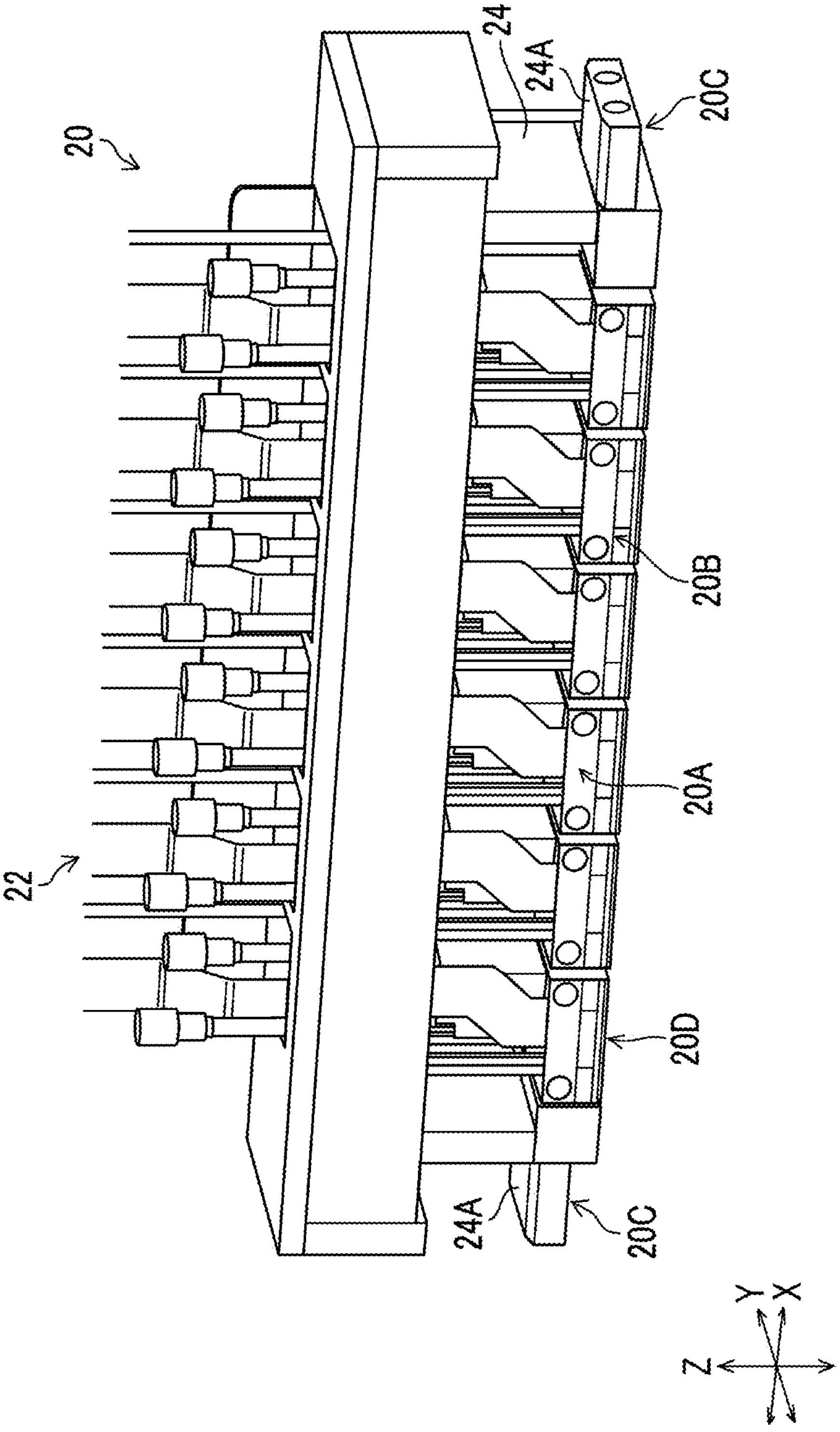
FIG. 3 is a perspective view showing a configuration example of a liquid jet head.

FIG. 3 is a perspective view showing a configuration example of the liquid jet head. The liquid jet head 20 has a structure in which the plurality of head modules 22 are arranged in a row in the X direction. On a side surface 20A of the liquid jet head 20, a seal position 20B where the seal blade 15 shown in FIG. 1 is brought into contact is defined.

The side surface 20A of the liquid jet head 20 is a surface facing a direction orthogonal to a normal line of the nozzle surface 20D, and is a surface parallel to the X direction. FIG. 3 shows an aspect in which the side surfaces of the plurality of head modules 22 are the side surfaces 20A of the liquid jet head 20, but the side surface 20A of the liquid jet head 20 may be defined in the head holding housing 24.

The seal position 20B is a position on the upper side in the Z direction with respect to the nozzle surface 20D and is a position on a lower side in the Z direction with respect to a lower surface 20C.

Pressing units 24A are formed at both ends of the head holding housing 24 in the X direction. The pressing unit 24A is a plate-shaped member extending in the X direction, and a lower surface thereof parallel to the nozzle surface 20D functions as the lower surface 20C of the liquid jet head.

The lower surface 20C of the liquid jet head 20 is located on the outer side in the X direction outside the nozzle surfaces 20D of the head modules 22 at both ends in the X direction. The lower surface 20C of the liquid jet head 20 is located on an upper side in the Z direction with respect to the nozzle surface 20D.

It should be noted that the number of the head modules 22 and the disposition of the head modules 22 are not limited to the example shown in FIG. 3, and the number of the head modules 22 need only be 1 or more. In addition, a zigzag disposition of two rows or the like may be applied to the disposition of the head modules 22.

FIGS. 4A and 4B are perspective views showing a contact state and a separation state of the seal blade with respect to the liquid jet head. FIGS. 4A and 4B are partial cross-sectional views including a cross section to which a cross-sectional line along the Y direction is applied, and is an enlarged view in which a part of the cap device 10 is enlarged. Reference numeral 4A indicates the contact state of the seal blade, and reference numeral 4B indicates the separation state of the seal blade.

The contact state 4A of the seal blade is a state in which the liquid jet head 20 is located at the cap position, and the separation state 4B of the seal blade is a state in which the liquid jet head 20 is located at the purge position.

[Capping Method According to First Embodiment]

Figure 5:
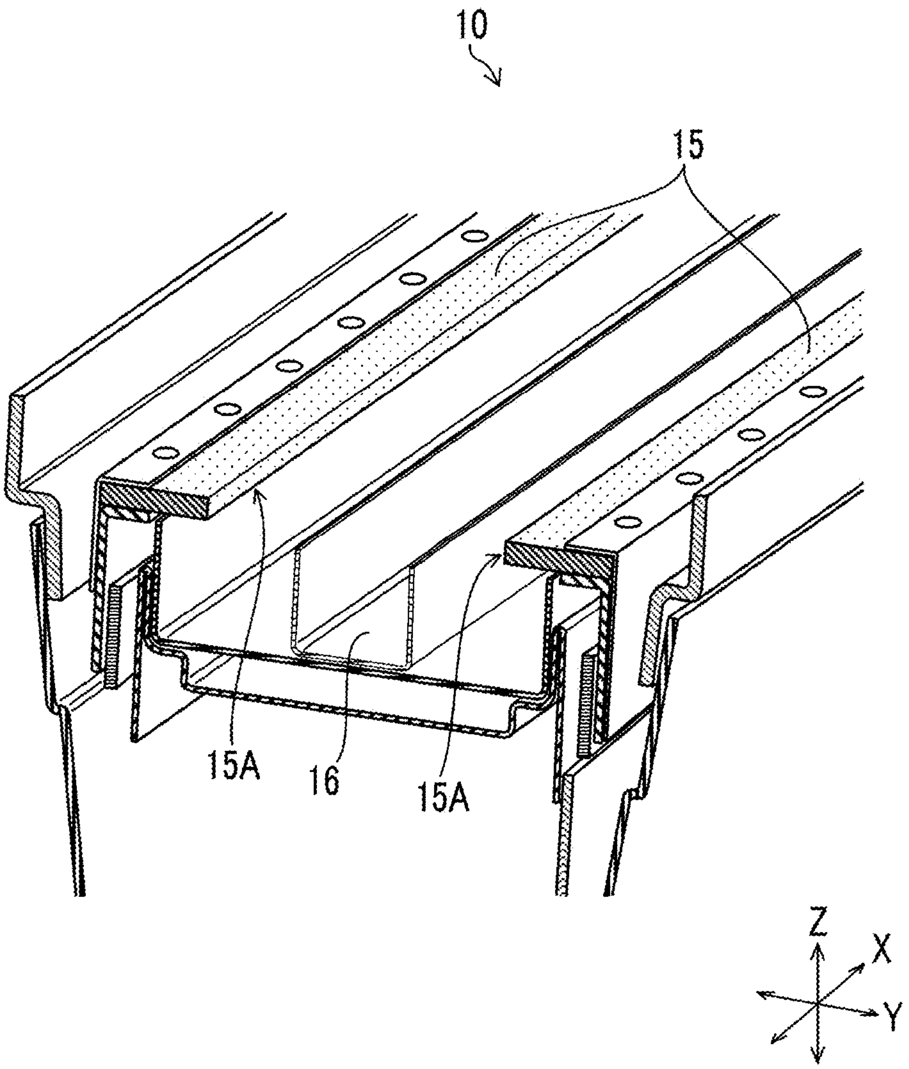
FIG. 5 is a perspective view showing a state of the seal blade in moisturizing processing.

FIG. 5 is a perspective view showing a state of the seal blade in the moisturizing processing. FIG. 5 is a partial cross-sectional view including a cross section to which a cross-sectional line along the Y direction is applied, and is an enlarged view in which a part of the cap device 10 is enlarged. It should be noted that, in FIG. 5, the liquid jet head 20 is not shown.

In a case in which the moisturizing processing of the liquid jet head 20 is performed, the liquid jet head 20 shown in FIG. 2 is lowered to move from the purge position to the cap position. The seal blade 15 is closed in response to the liquid jet head 20, and a distal end 15A of the seal blade 15 comes into contact with the seal position 20B on the side surface 20A of the liquid jet head 20.

That is, the seal blade 15 moves in a direction having a component in the Y direction opposite to the normal direction of the side surface 20A of the liquid jet head 20 and having a component in the upward direction of in the Z direction as the liquid jet head 20 moves in the downward direction of the Z direction, and comes into contact with the seal position 20B of the liquid jet head 20. As a result, the nozzle surface 20D and the moisturizing space of the cap device 10 including the moisturizing solution are sealed, and the preferred moisturizing of the nozzle surface 20D is realized.

Figure 6:
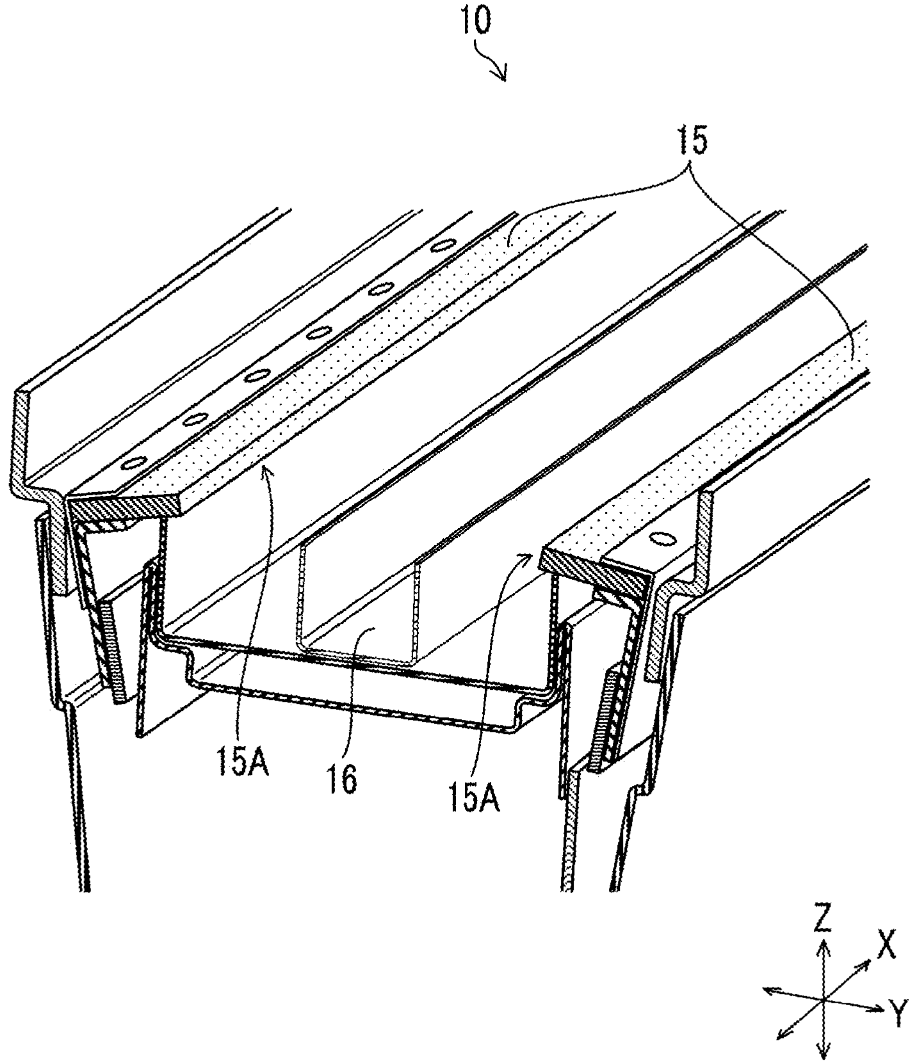
FIG. 6 is a perspective view showing a state of the seal blade in purge processing.

FIG. 6 is a perspective view showing a state of the seal blade in the purge processing. As in FIG. 5, FIG. 6 is a partial cross-sectional view including a cross section to which a cross-sectional line along the Y direction is applied, and is an enlarged view in which a part of the cap device 10 is enlarged. The liquid jet head 20 is not shown in FIG. 6.

In a case in which the liquid jet head 20 is lifted from the cap position, the seal blade 15 is opened in response to the lifting of the liquid jet head 20, and the distal end 15A of the seal blade 15 is separated from the seal position 20B of the liquid jet head 20. That is, the seal blade 15 moves in a direction having a component in the Y direction that is the normal direction of the side surface 20A of the liquid jet head 20 and having a component in the downward direction of in the Z direction as the liquid jet head 20 moves in the upward direction of the Z direction, and is separated from the seal position 20B of the liquid jet head 20.

As a result, in the purge processing, the adhesion of the ink mist generated due to the purge processing to the seal blade 15 is suppressed, and the adhesion of the ink mist adhering to the seal blade 15 to the liquid jet head 20 is suppressed.

It should be noted that the Y direction, which is the normal direction of the side surface 20A of the liquid jet head 20 described in the embodiment, is an example of a fourth direction, and the Y direction opposite to the normal direction of the side surface 20A of the liquid jet head 20 is an example of a fifth direction.

[Configuration Example of Seal Blade Moving Mechanism]

FIG. 7 is a perspective view of the seal blade moving mechanism. The seal blade moving mechanism 30 shown in FIG. 7 is applied with an opening/closing link mechanism and operates without driving control using a motor. That is, the seal blade moving mechanism 30 abuts the liquid jet head 20 shown in FIG. 3 on the seal blade moving mechanism 30 or separates the liquid jet head 20 from the seal blade moving mechanism 30, and opens and closes the seal blade moving mechanism 30 in response to the lifting and lowering of the liquid jet head 20.

The seal blade moving mechanism 30 comprises a swing member 34 and a fixing member 36. The swing member 34 fixedly supported by a seal blade support member 32 is joined to each of both ends of the seal blade 15 in the X direction.

The seal blade 15 need only be supported on at least any one of one end or the other end in the X direction, but it is preferable that both ends of the seal blade 15 in the X direction are supported in consideration of the deflection of the seal blade 15 in the X direction.

The seal blade moving mechanism 30 is attached to the upper surface 12 of the cap device 10 using the fixing member 36 such that the position thereof with respect to the opening 14 shown in FIG. 1 is aligned. The fixing member 36 is disposed at both ends of the opening 14 in the X direction and fixedly supports the seal blade moving mechanism 30 on the upper surface 12 of the cap device 10.

Figure 8:
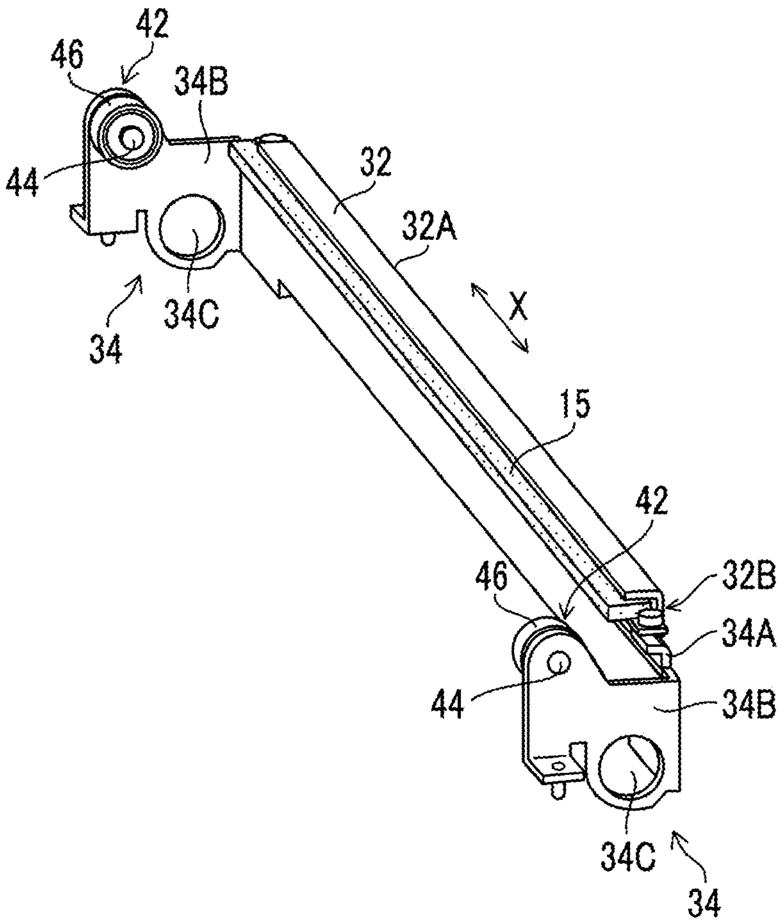
FIG. 8 is a perspective view of a seal blade support member.

FIG. 8 is a perspective view of the seal blade support member. FIG. 8 shows one of two seal blades 15 shown in FIG. 7. The seal blade support member 32 is a plate-shaped member subjected to bending processing, and has a total length in the longitudinal direction, which is longer than a total length of the seal blade 15. The seal blade 15 is joined to an upper surface 32A of the seal blade support member 32. The swing member 34 is joined to a side surface 32B of the seal blade support member 32.

Figure 9:
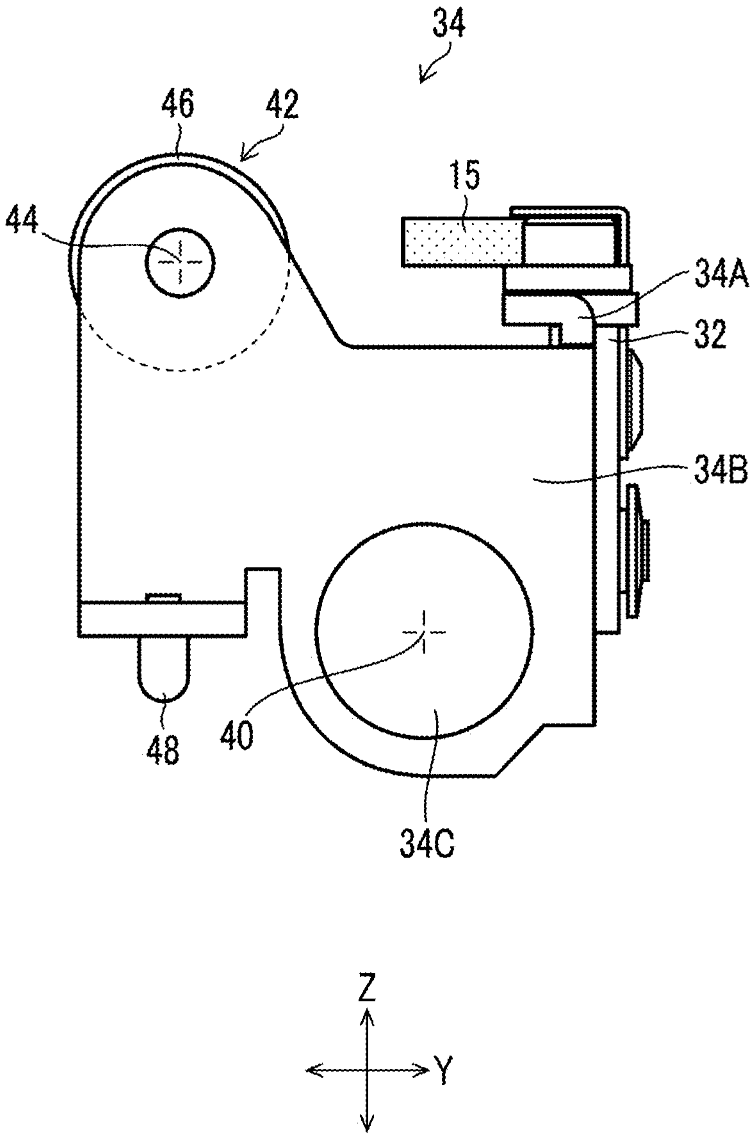
FIG. 9 is a front view of a swing member.

FIG. 9 is a front view of the swing member. FIG. 9 shows one swing member 34 shown in FIG. 8. The swing member 34 is a plate-shaped member subjected to bending processing, a side surface portion 34A is joined to the seal blade support member 32, and a hole 34C of a front surface portion 34B is joined to a bearing 41 that supports the swing shaft 40 shown in FIG. 7.

A head abutting position 42 is defined in the swing member 34. The head abutting position 42 comes into contact with the lower surface of the liquid jet head 20 and is pressed from the liquid jet head 20 in response to the lowering of the liquid jet head 20. An outer peripheral surface of an abutting roller 46 that is rotatably supported by using a rotation shaft 44 is applied to the head abutting position 42.

The swing member 34 has a structure in which a moving distance of the seal blade 15 in the Y direction in a case of rotating at any angle is larger than a moving distance in the Z direction. The moving distance of the seal blade 15 in the Y direction in a case in which the swing member 34 rotates is preferably at least twice the moving distance in the Z direction.

Figure 10:
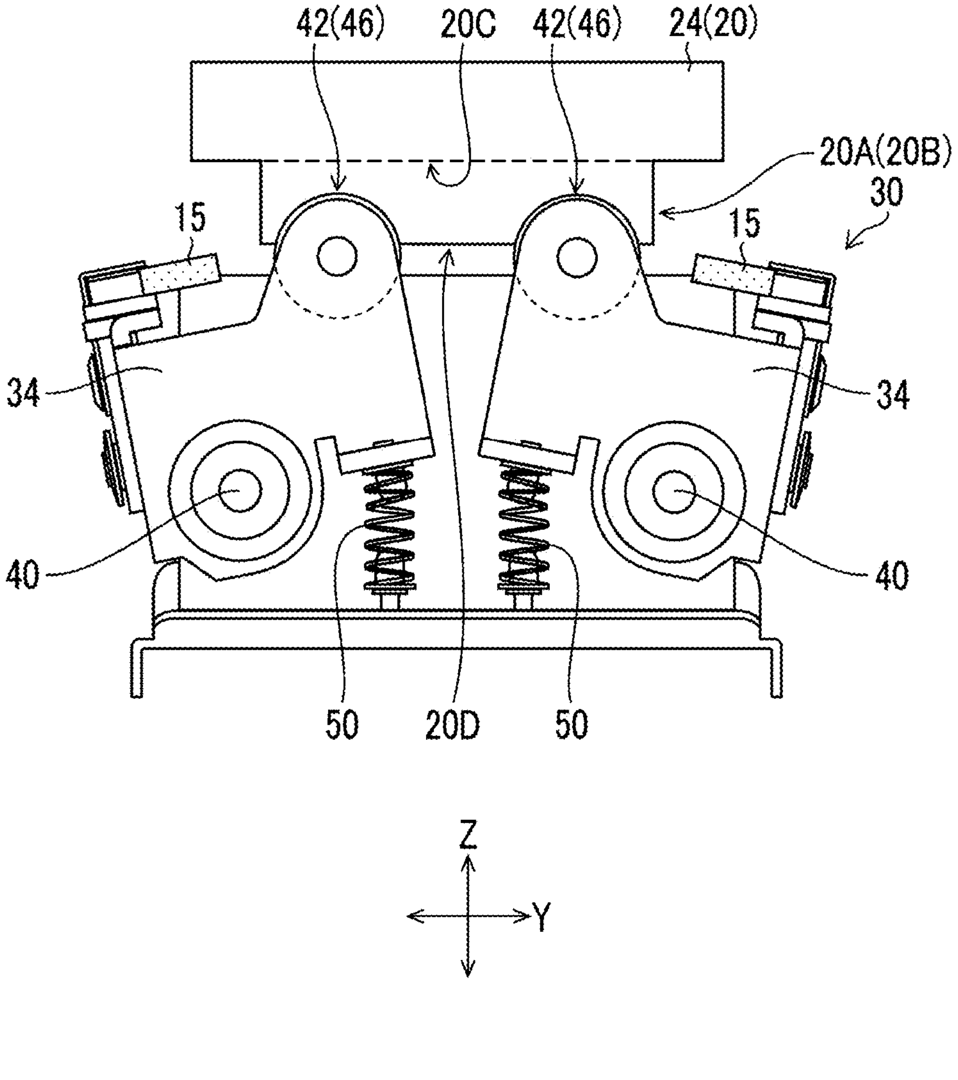
FIG. 10 is a schematic view showing a purge position of the liquid jet head.

A biasing member attachment portion 48 is formed in the swing member 34. A compression spring 50 shown in FIG. 10 is attached to the biasing member attachment portion 48. That is, the swing member 34 is biased in the upward direction of the Z direction by the compression spring 50. As a result, in a case in which the liquid jet head 20 is in a non-contact state with the head abutting position 42, the swing member 34 rotates in an opening direction of the seal blade moving mechanism 30, and the seal blade 15 is separated from the seal position 20B of the liquid jet head 20.

Returning to FIG. 5, in a case in which the seal blade moving mechanism 30 is closed and the seal blade 15 is brought into contact with the seal position 20B of the liquid jet head 20, the distal end 15A of the seal blade 15 is located at the highest position in the Z direction. On the other hand, in a case in which the liquid jet head 20 is moved in the upward direction of the Z direction and the seal blade moving mechanism 30 is opened to separate the seal blade 15 from the seal position 20B of the liquid jet head 20, the seal blade 15 is moved in a direction away from the liquid jet head in the Y direction and is moved in the downward direction of the Z direction. As a result, the liquid jet head 20 and the seal blade 15 can be separated from each other by applying a path in which the total length of the path is the shortest.

In a case of opening and closing the seal blade moving mechanism 30, the liquid jet head 20 and the seal blade 15 are moved in directions that are relatively opposite to each other in the Z direction. As a result, even in a case in which the position of the liquid jet head 20 and the position of the cap device 10 are shifted from each other in the Y direction, the contact between the nozzle surface 20D of the liquid jet head 20 and the seal blade 15 can be avoided.

[Capping Method According to Second Embodiment]

FIG. 10 is a schematic view showing the purge position of the liquid jet head 20. It should be noted that, in FIG. 10, some of the reference numerals shown in FIGS. 1 to 9 are not shown.

In a case in which the liquid jet head 20 shown in FIG. 10 is located at the purge position, the lower surface 20C of the liquid jet head 20 comes into contact with the head abutting position 42 and does not press the head abutting position 42. The purge position of the liquid jet head 20 may be a position of the liquid jet head 20 in the Z direction where the lower surface 20C of the liquid jet head 20 does not come into contact with the head abutting position 42.

Figure 11:
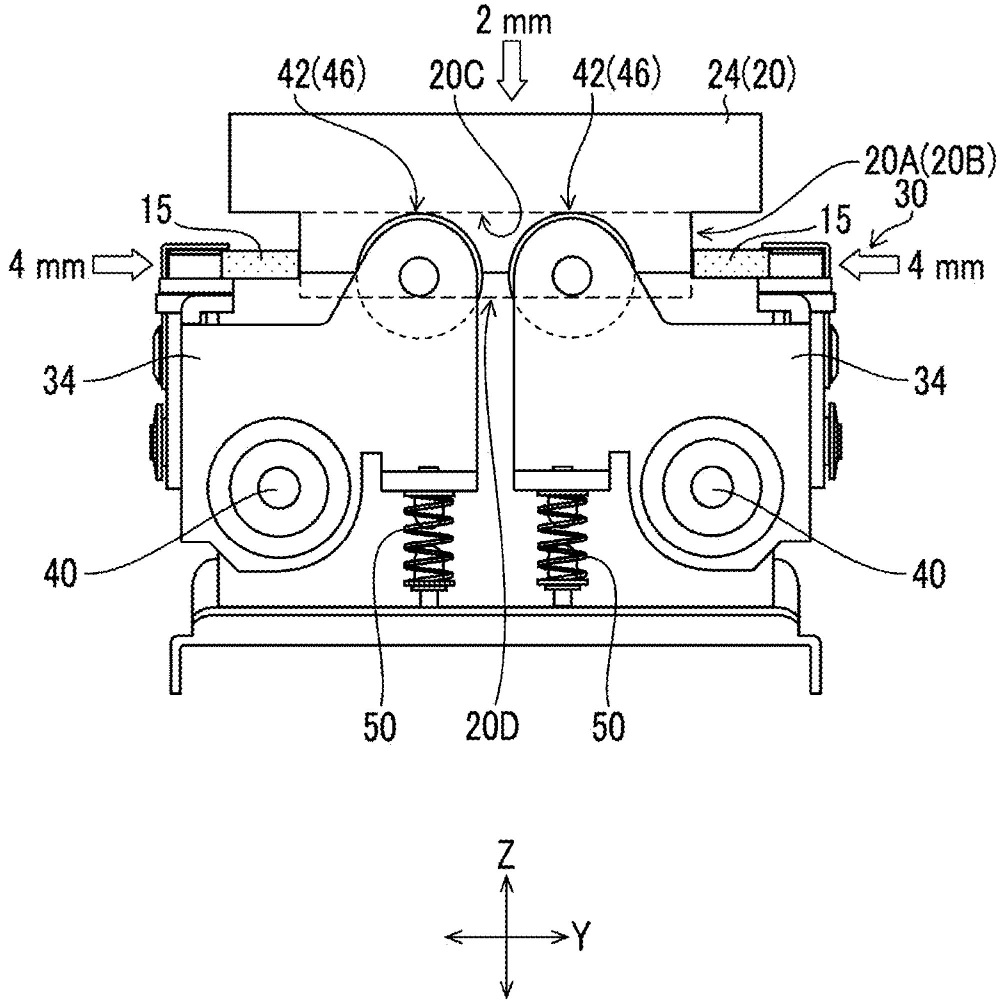
FIG. 11 is a schematic view showing a cap position of the liquid jet head.

FIG. 11 is a schematic view showing the cap position of the liquid jet head 20. The cap position of the liquid jet head 20 indicates a position of the liquid jet head 20 in the Z direction in a case in which the moisturizing processing of the liquid jet head 20 is performed.

In a case in which the liquid jet head 20 is located at the cap position, the lower surface 20C of the liquid jet head 20 abuts on the head abutting position 42 and presses the head abutting position 42. A downward arrow line shown in FIG. 11 indicates a direction in which the lower surface 20C of the liquid jet head 20 presses the head abutting position 42. An arrow line added to the seal blade 15 shown in FIG. 11 indicates a moving direction of the seal blade 15 in a case in which the lower surface 20C of the liquid jet head 20 presses the head abutting position 42.

For example, in a case in which the liquid jet head 20 moves by 2 millimeters from the purge position to reach the cap position, the seal blade 15 can move by 4 millimeters in a direction approaching the liquid jet head 20 in the Y direction. Similarly, in a case in which the liquid jet head 20 moves by 2 millimeters from the cap position to reach the purge position, the seal blade 15 can move by 4 millimeters in the direction away from the liquid jet head 20 in the Y direction.

Figure 12:
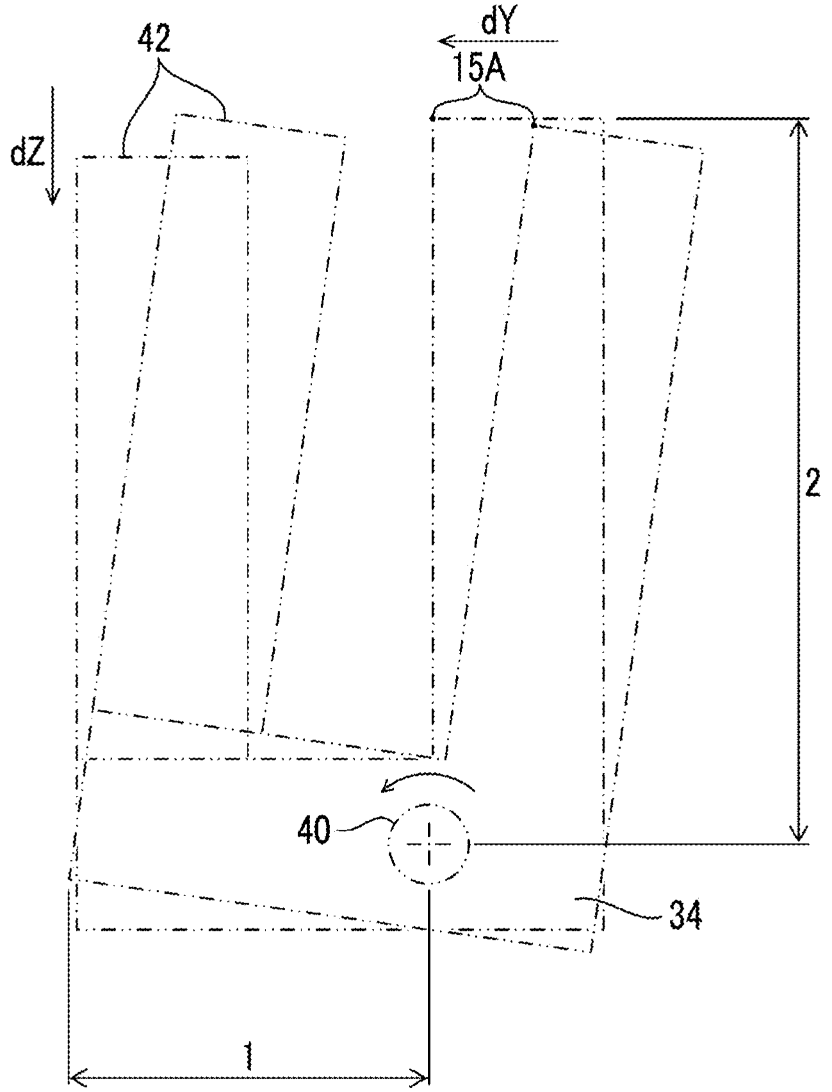
FIG. 12 is a schematic view showing a relationship between a moving distance of the liquid jet head and a moving distance of the seal blade.

FIG. 12 is a schematic view showing a relationship between the moving distance of the liquid jet head and the moving distance of the seal blade. FIG. 12 shows an example of a relationship between a moving amount dZ of the head abutting position 42 in the downward direction of the Z direction and a moving amount dY of the distal end 15A of the seal blade 15 in the Y direction in a case in which the head abutting position 42 is pressed in the downward direction of the Z direction.

A Z-direction component of a distance from the rotation center of the swing member 34 to the distal end 15A of the seal blade 15 and a Y-direction component of a distance from the rotation center of the swing member 34 to the head abutting position 42 can be set to 2:1. For example, in a case in which the moving amount dZ of the head abutting position 42 in the downward direction of the Z direction is 2.4 millimeters, the moving amount dY of the distal end 15A of the seal blade 15 in the Y direction is 4.8 millimeters.

[Capping Method According to Third Embodiment]

Figure 13:
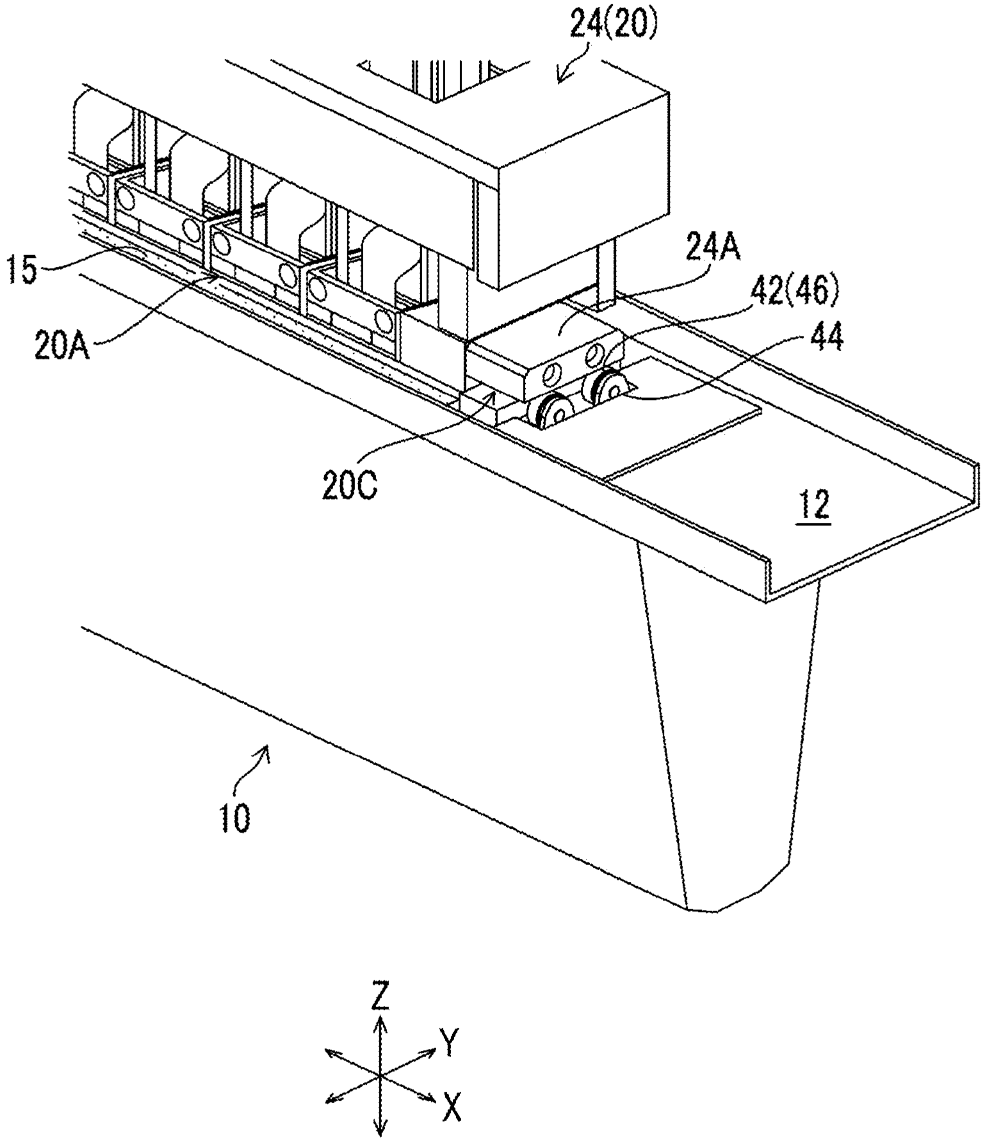
FIG. 13 is a perspective view showing a contact state between the seal blade moving mechanism and the liquid jet head.
Figure 14:
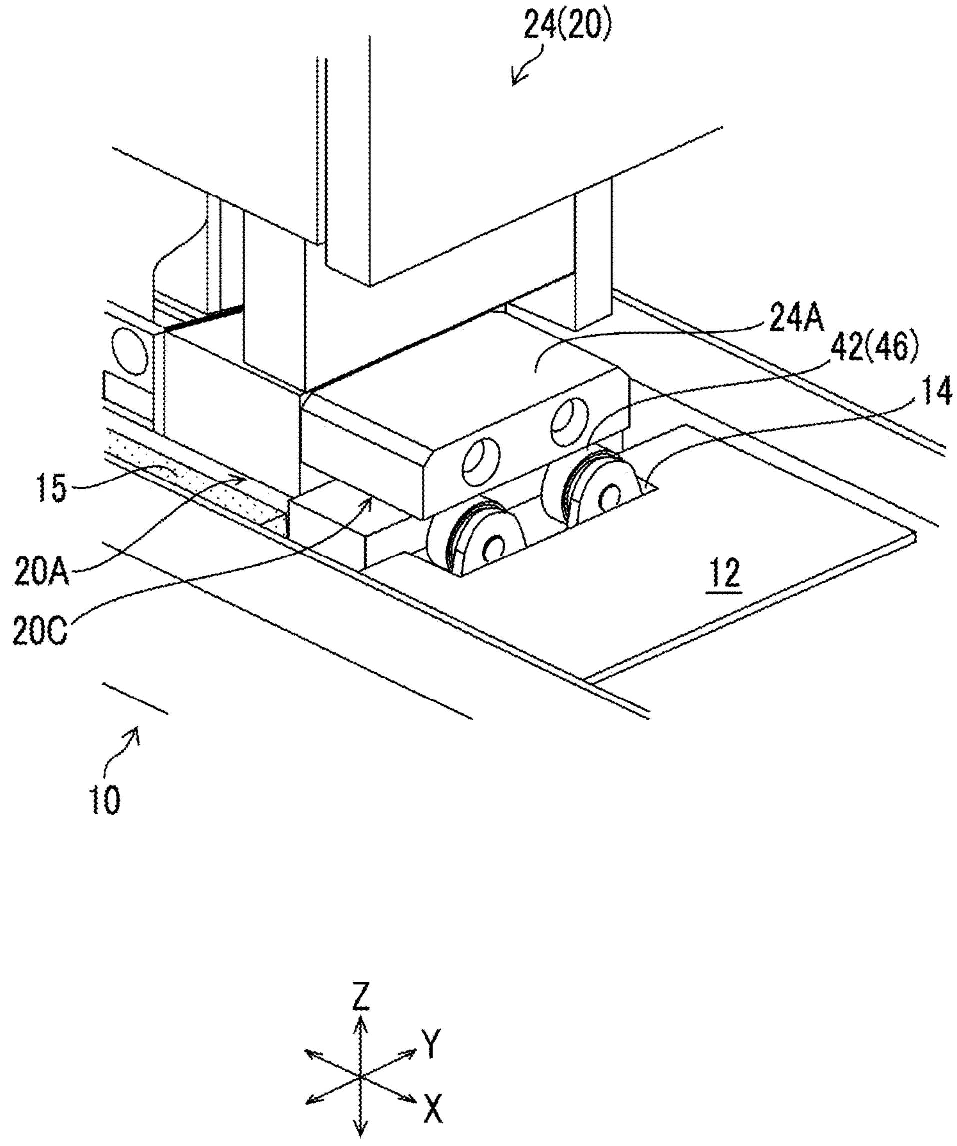
FIG. 14 is a partially enlarged view of FIG. 13.

FIG. 13 is a perspective view showing the contact state between the seal blade moving mechanism and the liquid jet head. FIG. 14 is a partially enlarged view of FIG. 13. The seal blade moving mechanism 30 may adopt a structure in which the lower surface 20C of the liquid jet head 20 is received by using the abutting roller 46 which is a rotation member.

That is, in the seal blade moving mechanism 30, the outer peripheral surface of the abutting roller 46 is applied as the head abutting position 42. The abutting roller 46 rotates around the rotation shaft 44 in a case in which the abutting roller 46 is pressed from the lower surface 20C of the liquid jet head 20 in the downward direction of the Z direction.

The head abutting position 42 of the seal blade moving mechanism 30 comes into contact with the lower surface 20C of the liquid jet head 20 and moves while rubbing the lower surface 20C of the liquid jet head 20 in the Y direction. The abutting roller 46 reduces the friction between the lower surface 20C of the liquid jet head 20 and the head abutting position 42, and suppresses the wear of the lower surface 20C of the liquid jet head 20 and the head abutting position 42.

[Capping Method According to Fourth Embodiment]

Figure 15:
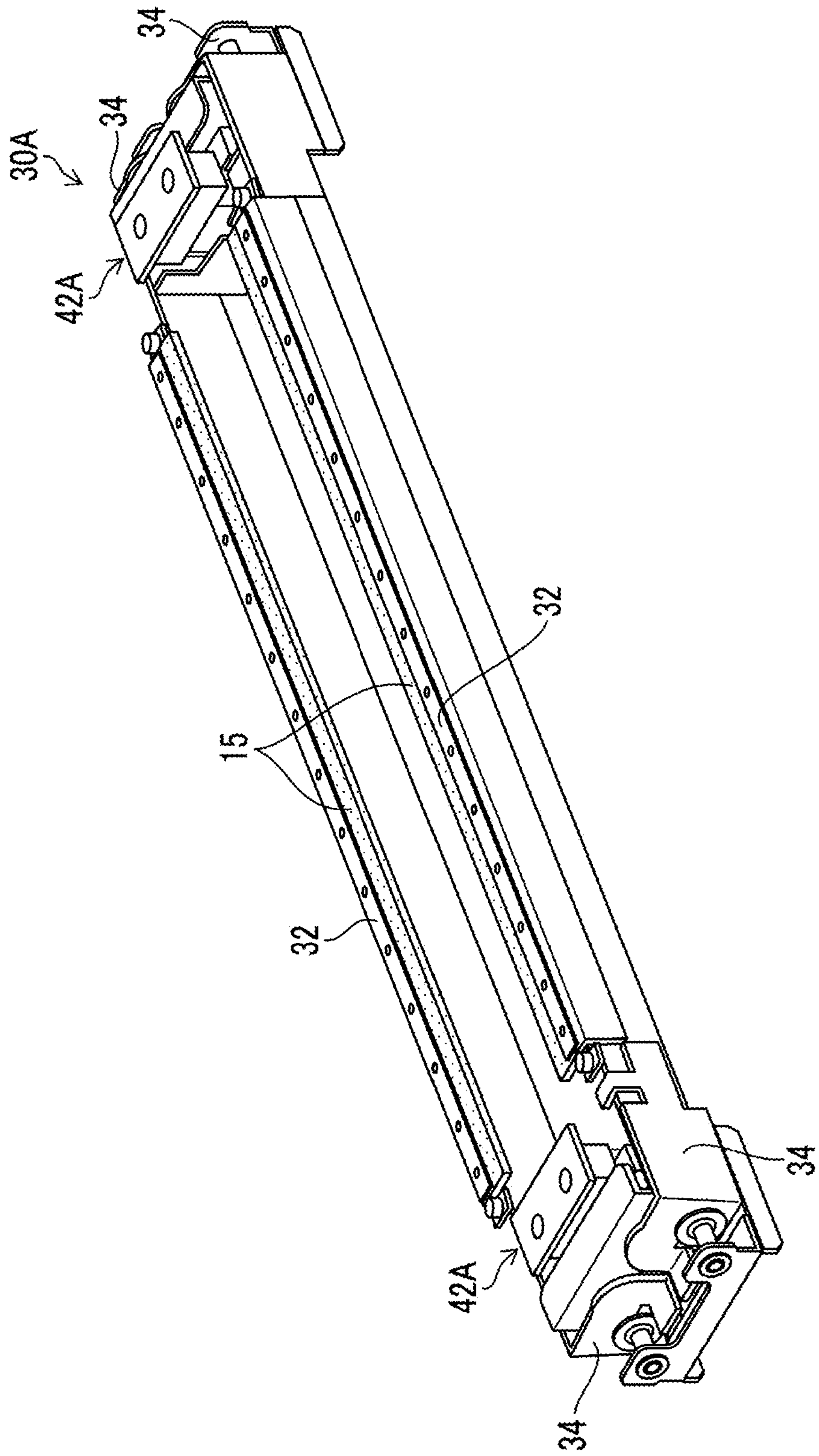
FIG. 15 is a perspective view showing a configuration example of a head abutting surface of the seal blade moving mechanism.

FIG. 15 is a perspective view showing a configuration example of a head abutting surface of the seal blade moving mechanism. A seal blade moving mechanism 30A shown in FIG. 15 has a structure in which the lower surface 20C of the liquid jet head 20 is received by using the head abutting surface 42A. As a result, local wear of the lower surface 20C of the liquid jet head 20 can be suppressed.

Figure 16:
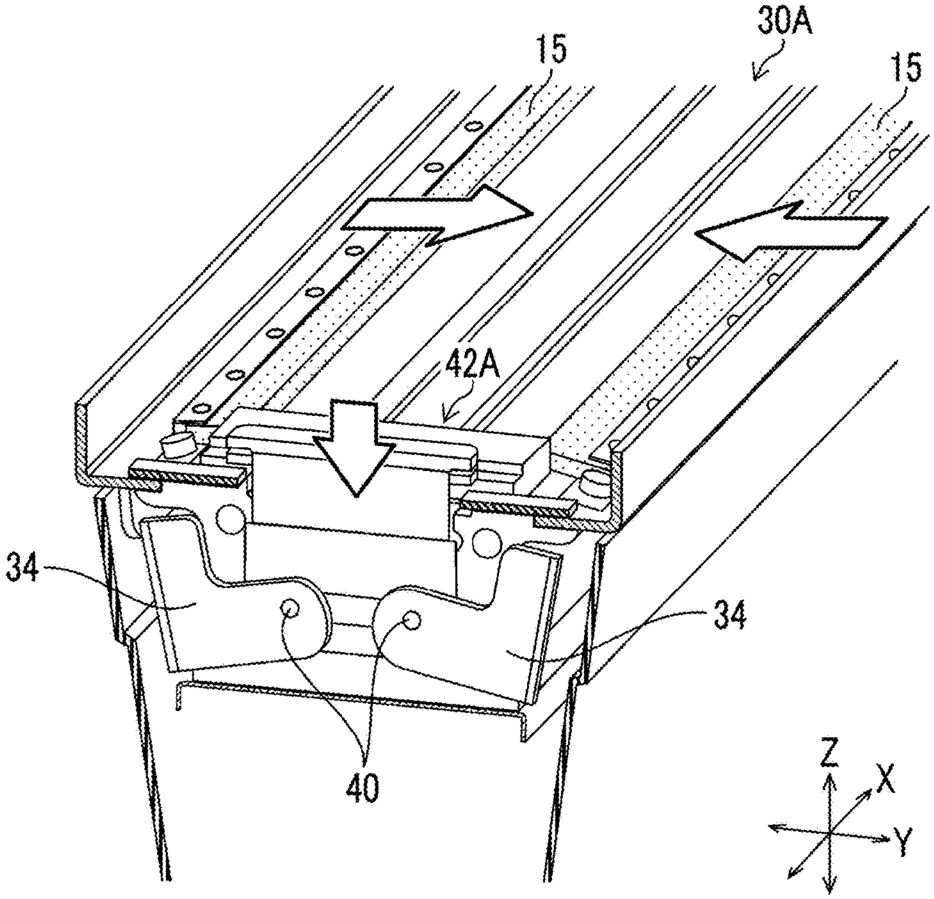
FIG. 16 is an operation explanatory view of the seal blade.

FIG. 16 is an operation explanatory view of the seal blade. FIG. 16 is a view showing a partial cross section of the cap device 10. FIG. 16 schematically shows an operation of the seal blade moving mechanism 30A shown in FIG. 15.

In a case in which the head abutting surface 42A shown in FIG. 16 moves in a direction of an arrow line facing the downward direction of the Z direction, the swing member 34 rotates about the swing shaft 40, the seal blade moving mechanism 30A is closed, and the seal blade 15 moves. An arrow line added to the vicinity of the seal blade 15 indicates the moving direction of the seal blade 15. On the other hand, in a case in which the head abutting surface 42A is moved in the upward direction of the Z direction, the seal blade moving mechanism 30 is opened, and the seal blade 15 is moved in the direction away from the liquid jet head.

Figure 17:
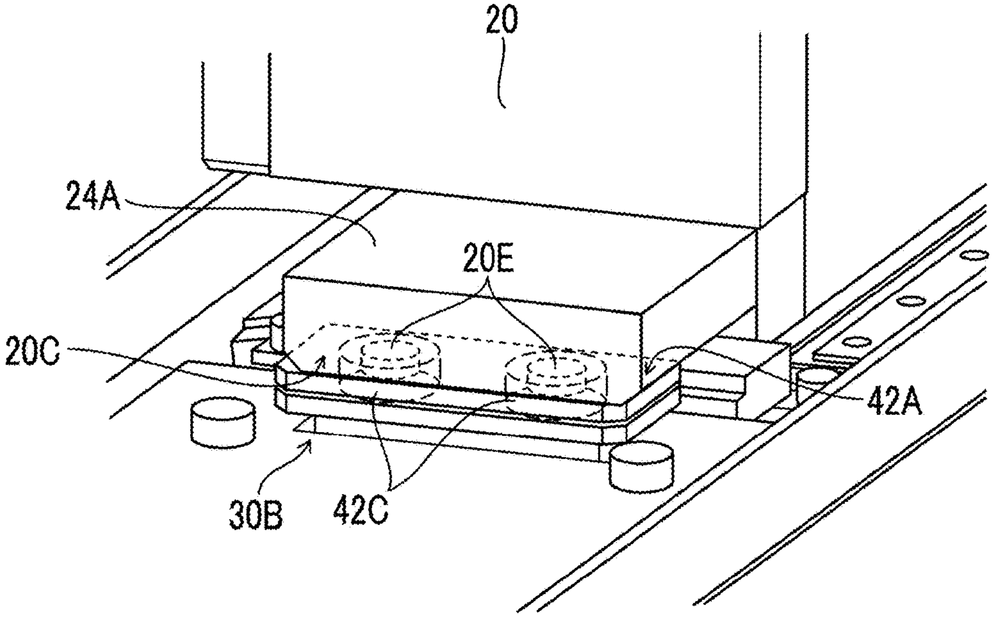
FIG. 17 is a perspective view showing a configuration example of a seal blade moving mechanism according to a modification example.

FIG. 17 is a perspective view showing a configuration example of a seal blade moving mechanism according to a modification example. A recess portion 42C is formed in the head abutting surface 42A of the seal blade moving mechanism 30B shown in FIG. 17. A protruding portion 20E is formed on the lower surface 20C of the liquid jet head 20.

Although FIG. 17 shows an aspect in which the recess portion 42C is formed on the head abutting surface 42A of the seal blade moving mechanism 30B and the protruding portion 20E is formed on the lower surface 20C of the liquid jet head 20, the protruding portion may be formed on the head abutting surface 42A and the recess portion may be formed on the lower surface 20C.

In addition, the number, the size, and the disposition of the recess portions 42C are not limited to the aspect shown in FIG. 17, and can be appropriately defined depending on the size and the shape of the head abutting surface 42A. The same applies to the protruding portion 20E.

The protruding portion 20E and the recess portion 42C are fitted to each other in a case in which the lower surface 20C of the liquid jet head 20 is brought into contact with the head abutting surface 42A. As a result, the accuracy of the relative positioning between the liquid jet head 20 and the cap device 10 can be improved.

[Actions and Effects of Cap Device and Capping Method According to Embodiment]

The cap device and the capping method according to the embodiment can obtain the following actions and effects.

[1]

The seal blade moving mechanism 30 transitions from an open state to a closed state in response to the movement from the purge position to the cap position for lowering the liquid jet head 20. The seal blade 15 is brought into contact with the seal position 20B defined on the side surface 20A of the liquid jet head 20 and defined at a position on the upper side in the Z direction with respect to the nozzle surface 20D, in response to the operation of closing the seal blade moving mechanism 30.

The seal blade moving mechanism 30 transitions from the closed state to the open state in response to the movement from the cap position to the purge position for lifting the liquid jet head 20. The seal blade 15 is separated from the seal position 20B in response to the operation of opening the seal blade moving mechanism 30. In a case in which the seal blade 15 is separated from the seal position 20B, the seal blade 15 moves in the direction away from the liquid jet head 20 in the Y direction and in the downward direction of the Z direction.

As a result, the contact between the nozzle surface 20D and the seal blade 15 is avoided, the movement of the ink mist generated during the purge processing of the liquid jet head 20 from the nozzle surface 20D to the seal blade 15 is suppressed, and the adhesion of the ink mist moved to the seal blade 15 to the liquid jet head 20 is suppressed.

In addition, it is possible to avoid an adjustment failure of the liquid jet head 20 caused by the adhesion of the ink mist. Examples of the adjustment failure of the liquid jet head 20 include an example in which the position of the head module 22 with respect to the head holding housing 24 cannot be adjusted.

Figure 18:
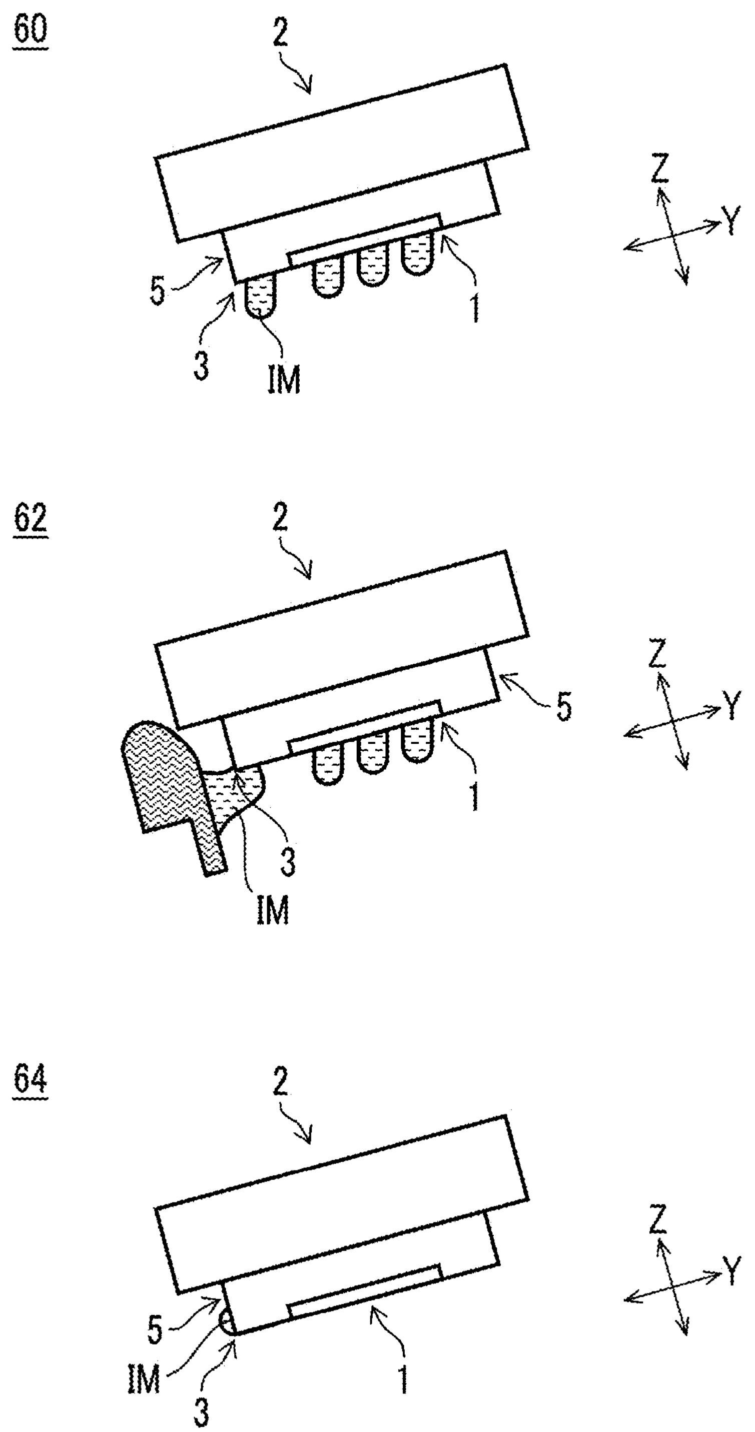
FIG. 18 is an explanatory view of a problem of a cap device according to a comparative example.

FIG. 18 is an explanatory view of a problem of a cap device according to a comparative example. FIG. 18 schematically shows a liquid jet head 2 having a posture in which a normal line of a nozzle surface 1 is inclined with respect to the vertical direction. In an ink mist adhesion state 60, ink mist IM generated due to the purge processing of the liquid jet head 2 adheres to the nozzle surface 1. The ink mist IM adhering to the nozzle surface 1 is transmitted to the nozzle surface 1 and moves to a lower end 3 of the liquid jet head 2.

In an ink mist diffusion state 62, in a case in which the liquid jet head 2 and the seal blade 4 are close to each other, the ink mist IM moved to the lower end 3 of the liquid jet head 2 bridges the seal blade 4, and is expanded in the X direction between the seal blade 4 and the liquid jet head 2. It should be noted that the X direction is a direction orthogonal to the Y direction and the Z direction, and is a direction penetrating the paper surface of FIG. 18.

An ink mist residual state 64 is a state in which the wiping of the nozzle surface 1 is performed by moving the liquid jet head 2 away from the seal blade 4. In the ink mist residual state 64, the ink mist IM adhering to the side surface 5 of the liquid jet head 2 remains.

On the other hand, with the cap device and the capping method according to the embodiment, the adhesion of the ink to the seal blade 15 shown in FIG. 1 and the like and the adhesion of the ink to the side surface 20A of the liquid jet head 20 are suppressed.

[2]

An opening/closing link mechanism that operates the mechanical mechanism as the liquid jet head 20 moves in the Z direction is applied to the seal blade moving mechanism 30. As a result, the opening and closing of the seal blade moving mechanism 30 can be performed without driving using the motor.

[3]

A distance between the seal position 20B of the liquid jet head 20 and the seal blade 15 at the purge position is defined, and a trajectory of the opening and closing of the seal blade 15 is defined. As a result, the adhesion of the ink to the seal blade 15 is suppressed.

[4]

The seal blade moving mechanism 30 abuts the lower surface 20C different from the nozzle surface 20D of the liquid jet head 20 on the head abutting position 42. The lower surface 20C is defined at a position outside both ends of the nozzle surface 20D of the liquid jet head 20 in the X direction. As a result, it is possible to avoid the contact between the nozzle surface 20D and the seal blade moving mechanism 30 in a case in which the liquid jet head 20 abuts on the head abutting position 42.

[Example of Application to Liquid Jet System]

Hereinafter, as the liquid jet system to which the cap device according to the embodiment is applied, a printing system to which an ink jet method is applied will be described. It should be noted that the term "system" can include the concept of "device". That is, in the following liquid jet system, any of an aspect in which each portion of the components is continuously and integrally disposed or an aspect in which the components are dispersedly disposed may be applied.

[Overall Configuration]

Figure 19:
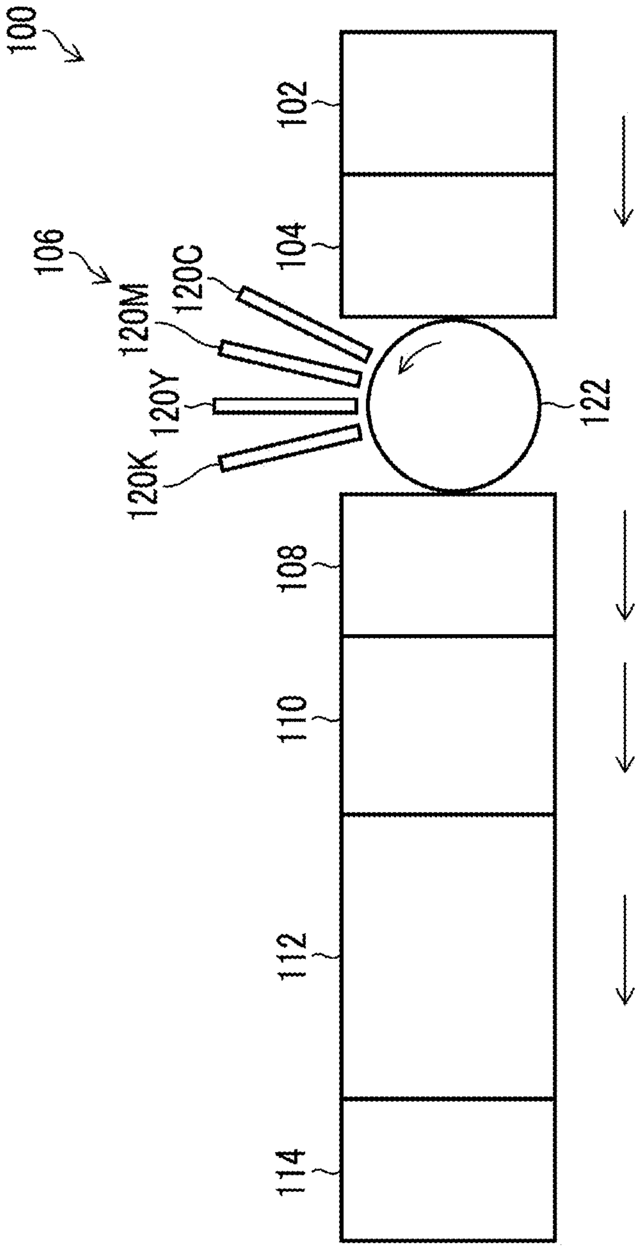
FIG. 19 is an overall configuration view showing a schematic configuration of a printing system according to the embodiment.
Figure 20:
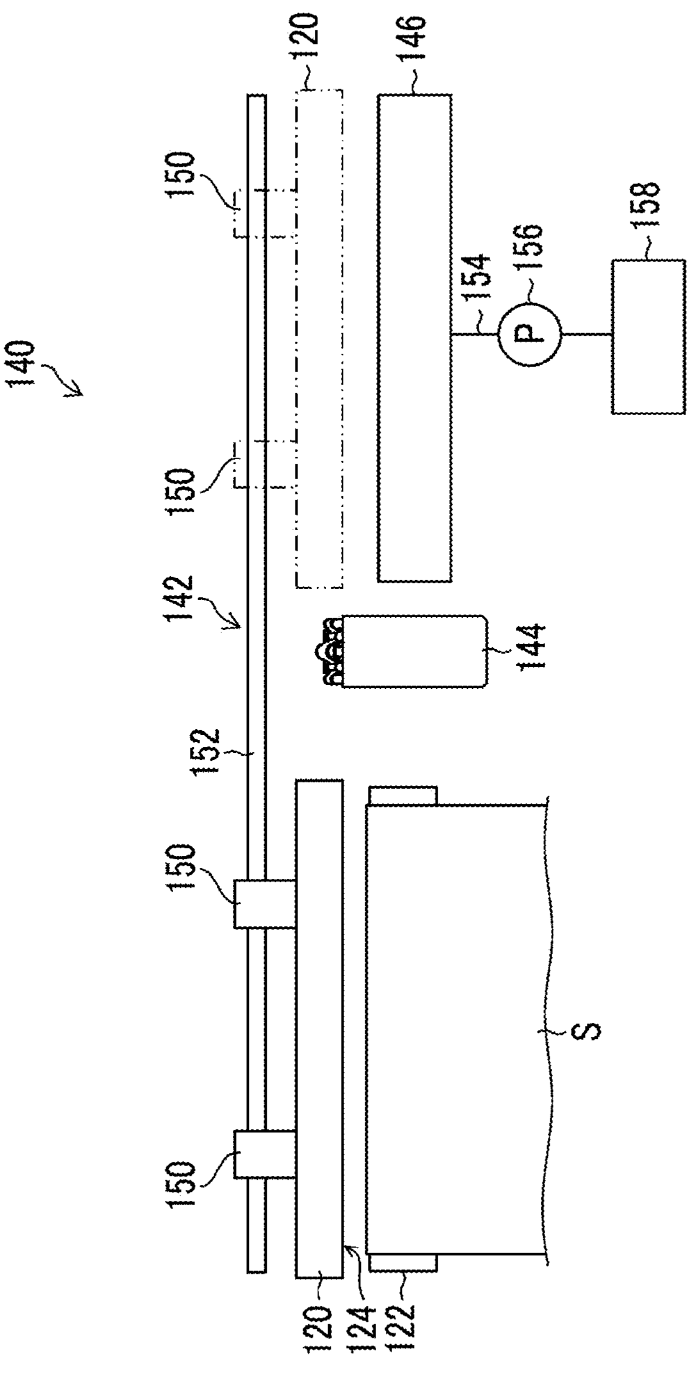
FIG. 20 is a schematic view showing a configuration example of a maintenance device applied to the printing system shown in FIG. 19.

FIG. 19 is an overall configuration view showing a schematic configuration of the liquid jet system according to the embodiment. A printing system 100 is provided with a printing device 106 of a digital type that prints a color image on a substrate by applying single-pass printing. It should be noted that the substrate is shown in FIG. 20 with reference numeral S.

As the substrate, a paper medium such as single-wafer paper and continuous paper, a sheet-like metal medium, a cloth medium such as a cloth, and the like may be applied. A soft package such as a plastic film may be applied to the substrate. The substrate may be a single layer or a plurality of layers superimposed on each other. The substrate may have a roll-to-roll continuous form or a single-wafer form cut to a defined length. It should be noted that the substrate will be referred to as a medium, media, a sheet, a film, a substrate, or the like in some cases.

The printing system 100 comprises a substrate supply device 102, a first intermediate transport device 104, the printing device 106, a second intermediate transport device 108, a measurement device 110, a drying device 112, and an accumulation device 114.

The printing system 100 further comprises a maintenance device. In FIG. 19, the maintenance device is not shown. The maintenance device is shown in FIG. 20 with reference numeral 140. Hereinafter, each of the units will be described in detail.

[Substrate Supply Device]

In a case in which the substrate has a continuous form, the substrate supply device 102 includes a roll accommodation portion that accommodates a roll around which the substrate is wound. In a case in which the substrate has a single-wafer form, the substrate supply device 102 comprises a tray in which the substrate is accommodated. The substrate supply device 102 supplies the substrate to the first intermediate transport device 104 in response to printing control of the printing device 106. The substrate supply device 102 may comprise a correction mechanism that corrects a posture of the substrate.

[First Intermediate Transport Device]

The first intermediate transport device 104 delivers the substrate supplied from the substrate supply device 102 to the printing device 106. A known configuration corresponding to the form of the substrate may be applied to the first intermediate transport device 104. It should be noted that an arrow line from the substrate supply device 102 toward the first intermediate transport device 104 indicates a substrate transport direction.

[Printing Device]

The printing device 106 comprises an ink jet head 120C, an ink jet head 120M, an ink jet head 120Y, and an ink jet head 120K. The ink jet head 120C, the ink jet head 120M, the ink jet head 120Y, and the ink jet head 120K are disposed in the order described above from an upstream side along the substrate transport direction.

The ink jet head 120C jets cyan ink. The ink jet head 120M jets magenta ink. The ink jet head 120Y jets yellow ink. The ink jet head 120K jets black ink.

A line head in which a plurality of nozzles are disposed in a substrate width direction over a length equal to or larger than the total length of the substrate may be applied to the ink jet head 120C or the like. Examples of the configuration example of the line head include a configuration in which a plurality of head modules are connected to each other. The two-dimensional disposition such as matrix disposition is applied to the plurality of nozzles provided in the ink jet head 120C or the like.

In the ink jet head 120C and the like, a piezoelectric jet method comprising a piezoelectric element as a jetting pressure element that generates a jetting pressure may be applied. For the ink jet head 120C and the like, a thermal method of jetting the ink by using a film boiling phenomenon of the ink may be applied.

The printing device 106 forms the color image on the substrate by using color ink such as cyan ink. The printing device 106 forms a white image, which serves as a background image of the color image, by using white ink.

Each of the ink jet head 120C, the ink jet head 120M, the ink jet head 120Y, and the ink jet head 120K shown in FIG. 19 may be applied to the liquid jet head 20 shown in FIG. 3.

A posture in which the normal line of the nozzle surface intersects the vertical direction is applied to the ink jet head 120C and the like shown in FIG. 19. The Z direction shown in FIG. 3 is a direction parallel to the normal direction of each nozzle surface of the ink jet head 120C or the like. In addition, the X direction is a direction parallel to the substrate width direction, and the Y direction is a direction parallel to the substrate transport direction.

The printing device 106 shown in FIG. 19 comprises a printing drum 122. The printing drum 122 has a cylindrical shape. The printing drum 122 comprises, on a peripheral surface thereof, a substrate support area that supports the substrate. It should be noted that the substrate support area is not shown.

A rotation shaft of the printing drum 122 is connected to a motor (not shown) via a drive mechanism (not shown). In a case in which the motor is rotated, the printing drum 122 rotates in a direction indicated by an arrow line. In a case in which the printing drum 122 is rotated, the substrate supported on the peripheral surface of the printing drum 122 is transported along a rotation direction of the printing drum 122.

A plurality of suction holes are formed in the substrate support area. The plurality of suction holes are disposed based on a defined pattern. The plurality of suction holes communicate with a suction flow channel (not shown). The suction flow channel is connected to a suction pump (not shown). The suction pump is operated to support the substrate by suction on the peripheral surface of the printing drum 122 using the negative pressure generated in the plurality of suction holes.

A transport form of the substrate in the printing device 106 is not limited to the transport form using the printing drum 122. For example, a transport form using a transport belt and a transport form using a plurality of rollers can be applied.

[Second Intermediate Transport Device]

The second intermediate transport device 108 delivers the substrate delivered from the printing drum 122 to the measurement device 110. The same configuration as the configuration of the first intermediate transport device 104 may be applied to the second intermediate transport device 108. It should be noted that an arrow line shown in the second intermediate transport device 108 represents the substrate transport direction of the second intermediate transport device 108.

[Measurement Device]

The measurement device 110 reads a test pattern printed on the substrate to acquire read data of the test pattern. The measurement device 110 may detect a jet abnormality of the ink jet head 120C or the like based on the read data of the test pattern.

The measurement device 110 may read a print image printed on the substrate to acquire the read data of the print image. The measurement device 110 may detect a defect in the print image based on the read data of the print image.

[Drying Device]

The drying device 112 performs drying processing on the printed substrate. The drying device 112 comprises a heater and a fan, and may adopt a configuration in which hot air is blown onto the printed substrate. The drying device 112 comprises a drying transport unit that transports the printed substrate. As a transport form of the printed substrate, a known transport form such as drum transport, belt transport, and roller transport may be applied. It should be noted that an arrow line shown in the drying device 112 indicates the substrate transport direction in the drying device 112.

[Accumulation Device]

The accumulation device 114 accommodates the substrate delivered from the drying device 112. In a case in which the substrate has a continuous form, the accumulation device 114 comprises a roll accommodation portion that accommodates a roll around which the substrate is wound. In a case in which the substrate has a single-wafer form, the accumulation device 114 comprises a tray in which the substrate is accommodated.

[Configuration Example of Maintenance Device]

FIG. 20 is a schematic view showing a configuration example of the maintenance device applied to the printing system shown in FIG. 19. The maintenance device 140 shown in FIG. 20 is disposed side by side with the printing device 106 with respect to a direction penetrating the paper surface of FIG. 19. In the following description, the ink jet head 120C and the like shown in FIG. 19 will be collectively referred to as an ink jet head 120 in some cases.

The maintenance device 140 shown in FIG. 20 comprises a head moving device 142, a wiping device 144, and a cap device 146. The head moving device 142 moves the ink jet head 120 between a printing position and a maintenance position.

FIG. 20 shows a configuration in which the head moving device 142 comprises a carriage 150 coupled to the ink jet head 120 and a guide 152 that supports the carriage 150, as a configuration example. It should be noted that, in FIG. 20, a linear moving mechanism connected to the carriage 150, a motor connected to the linear moving mechanism, and the like are not shown.

The printing position is a position of the ink jet head 120 that performs the printing on the substrate S by causing the ink jet head 120 to jet the ink. FIG. 20 shows the ink jet head 120 located at the printing position by using a solid line. The maintenance position is a position of the ink jet head 120 at which the maintenance of the ink jet head 120 is performed.

The maintenance of the ink jet head 120 includes the wiping of the nozzle surface 124 to which the wiping device 144 is applied, the purge in which the jetting element of each nozzle is operated to discharge the ink from the nozzle opening to the cap device 146, and the moisturizing in which the moisturizing solution is applied to the inside of the cap device 146.

The cap device 146 is connected to a discharge tank 158 via a discharge flow channel 154 and a discharge pump 156. The ink discharged to the cap device 146 is fed to the discharge tank 158 by operating the discharge pump 156. The cap device 146 shown in FIG. 20 is applied to the cap device 10 shown in FIG. 1 or the like.

FIG. 20 shows the ink jet head 120 at an execution position of the maintenance to which the cap device 146 is applied among the maintenance positions, by using a one-dot chain line. The maintenance position includes a position at which the wiping of the nozzle surface 124 is performed by using the wiping device 144.

The wiping device 144 causes a web, which is a sheet-like wiping member to travel, and brings the traveling web into contact with the nozzle surface 124 to wipe the nozzle surface 124 of the ink jet head 120 that moves along the guide 152.

The maintenance device 140 comprises a head lifting/lowering device. The head lifting/lowering device lifts and lowers the ink jet head 120 at the printing position. The head lifting/lowering device lifts and lowers the ink jet head 120 in a case in which the purge processing of the ink jet head 120 is performed and in a case in which the moisturizing processing of the ink jet head 120 is performed by using the cap device. It should be noted that the head lifting/lowering device is not shown.

The lifting of the ink jet head 120 is the movement of the ink jet head 120 in the upward direction of the Z direction. The lowering of the ink jet head 120 is the movement of the ink jet head 120 in the downward direction of the Z direction. The upward direction is a direction having a component in the vertical upward direction, and the downward direction is a direction having a component in the vertical downward direction.

[Configuration Example of Cap Device]

Figure 21:
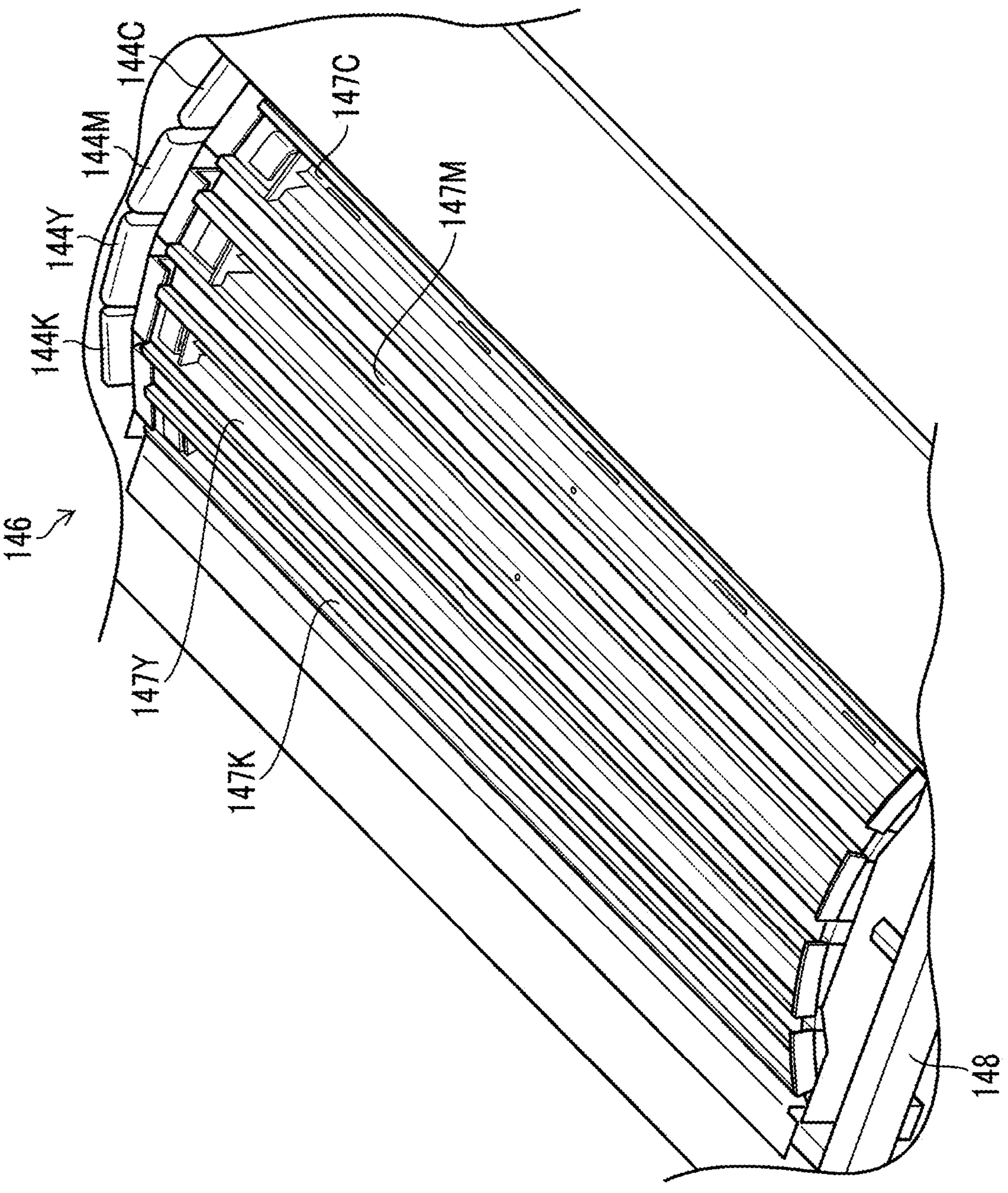
FIG. 21 is a perspective view showing a configuration example of the cap device applied to the maintenance device shown in FIG. 20.

FIG. 21 is a perspective view showing a configuration example of the cap device applied to the maintenance device shown in FIG. 20. It should be noted that, in FIG. 21, a wiping device 144C corresponding to the ink jet head 120C, a wiping device 144M corresponding to the ink jet head 120M, a wiping device 144Y corresponding to the ink jet head 120Y, and a wiping device 144K corresponding to the ink jet head 120K are simply shown.

The cap device 146 shown in FIG. 21 comprises a cap 147C, a cap 147M, a cap 147Y, and a cap 147K. Each of the cap 147C, the cap 147M, the cap 147Y, and the cap 147K is applied to the cap device 10 shown in FIG. 1 or the like. It should be noted that, in FIG. 21, a detailed structure of the cap device 10 shown in FIG. 1 is not shown.

The cap 147C, the cap 147M, the cap 147Y, and the cap 147K are integrally supported by a frame 148. The cap 147C has a posture inclined with respect to the horizontal direction in response to the direction of the nozzle surface 124 of the ink jet head 120C. The postures of the cap 147M, the cap 147Y, and the cap 147K are also the same.

The cap device 146 may apply an independent configuration in which the cap 147C, the cap 147M, the cap 147Y, and the cap 147K are separated from each other.

[Electric Configuration of Liquid Jet System]

Figure 22:
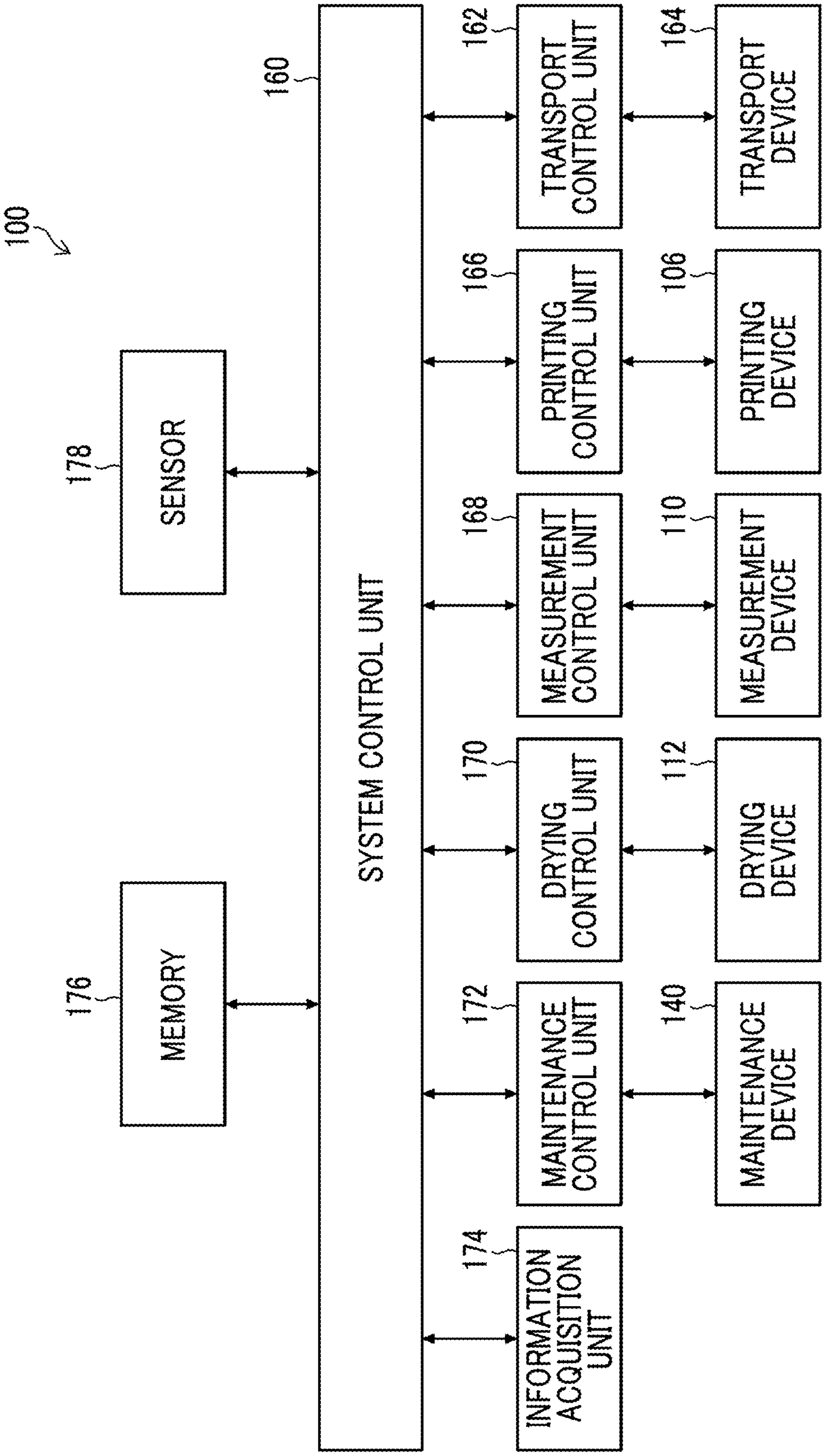
FIG. 22 is a functional block diagram showing an electric configuration of the printing system shown in FIG. 19.

FIG. 22 is a functional block diagram showing an electric configuration of the printing system shown in FIG. 19. The printing system 100 comprises a system control unit 160, a transport control unit 162, a printing control unit 166, a measurement control unit 168, a drying control unit 170, a maintenance control unit 172, and an information acquisition unit 174.

The system control unit 160 comprehensively controls an overall operation of the printing system 100. The system control unit 160 transmits command signals to various control units. The system control unit 160 functions as a memory controller that controls the storage of data in a memory 176 and the read of data from the memory 176.

The system control unit 160 acquires a sensor signal transmitted from a sensor 178 and transmits the command signals based on the sensor signal to various control units. The sensor 178 includes a position detection sensor, a temperature sensor, and the like provided in each unit of the printing system 100.

The transport control unit 162 sets a transport condition based on the command signal transmitted from the system control unit 160, and controls the operation of the transport device 164 based on the set transport condition. The transport device 164 shown in FIG. 22 includes the drying transport device provided in the first intermediate transport device 104, the printing drum 122, and the drying device 112 shown in FIG. 19. The transport device 164 may include the substrate supply device 102 and the accumulation device 114.

The printing control unit 166 sets a printing condition based on the command signal transmitted from the system control unit 160 and controls an operation of the printing device 106 based on the set printing condition. That is, the printing control unit 166 comprises an image processing unit that executes color separation processing, color conversion processing, correction processing of each processing, and halftone processing on the print data to generate halftone data for each color.

The printing control unit 166 comprises a drive voltage generation unit that generates a drive voltage supplied to the ink jet head 120C or the like based on the halftone data of each color. The printing control unit 166 comprises a drive voltage output unit that supplies the drive voltage to the ink jet head 120C.

The printing control unit 166 performs the correction of the printing device 106 based on the measurement data obtained using the measurement device 110. The printing system 100 may further comprise a correction processing unit that performs the correction of the printing device 106 based on the measurement data obtained using the measurement device 110, separately from the printing control unit 166.

The measurement control unit 168 sets a measurement condition based on the command signal transmitted from the system control unit 160, and controls an operation of the measurement device 110 based on the set measurement condition.

The drying control unit 170 sets a processing condition of main drying processing based on the command signal transmitted from the system control unit 160, and controls an operation of the drying device 112 based on the set processing condition.

The maintenance control unit 172 sets a maintenance condition based on the command signal transmitted from the system control unit 160, and controls an operation of the maintenance device 140 based on the set maintenance condition.

The maintenance control unit 172 functions as a wiping control unit that controls an operation of the wiping device 144 shown in FIG. 20 and a cap control unit that controls an operation of the cap device 146. In addition, the maintenance control unit 172 functions as a head moving control unit that controls an operation of the head moving device 142 and a head lifting/lowering control unit that controls an operation of the head lifting/lowering device.

The information acquisition unit 174 acquires various information applied to the control of the printing system 100. The system control unit 160 transmits the command signals to various control units based on the various information acquired using the information acquisition unit 174.

The memory 176 can store various data, parameters, and programs applied to the printing system 100. The system control unit 160 controls an operation of the printing system 100 with reference to various data stored in the memory 176. The sensor 178 includes various sensors provided in the printing system 100.

[Hardware Configuration Example of Control Device Applied to Printing System]

Figure 23:
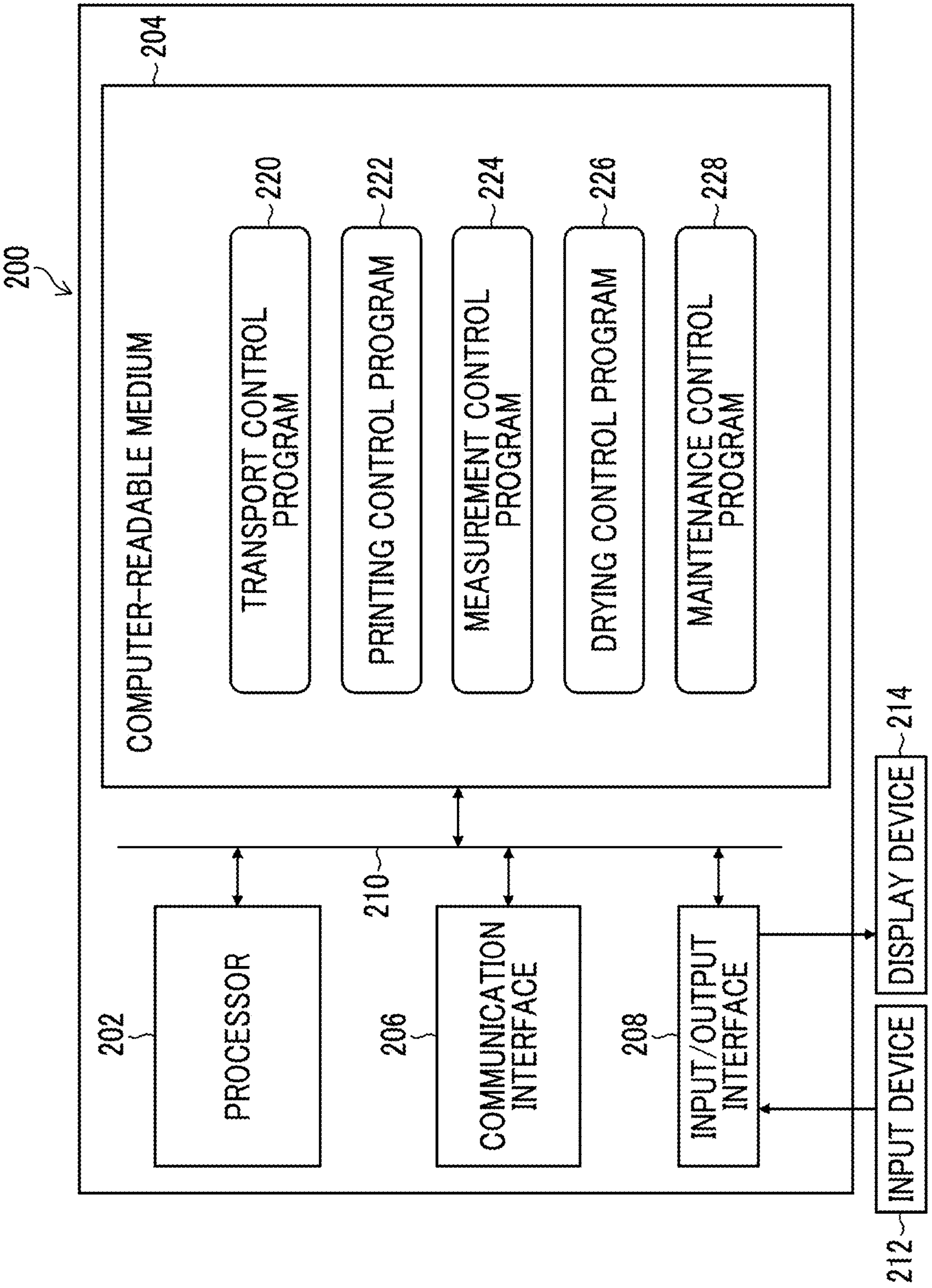
FIG. 23 is a block diagram showing a hardware configuration example of a control device applied to the printing system shown in FIG. 19.

FIG. 23 is a block diagram showing a hardware configuration example of a control device applied to the printing system shown in FIG. 19. A control device 200 provided in the printing system 100 comprises a processor 202, a computer-readable medium 204 that is a non-transitory tangible object, a communication interface 206, and an input/output interface 208.

A computer is applied as the control device 200. A form of the computer may be a server, a personal computer, a workstation, a tablet terminal, and the like.

The processor 202 includes a central processing unit (CPU). The processor 202 may include a graphics processing unit (GPU). The processor 202 is connected to the computer-readable medium 204, the communication interface 206, and the input/output interface 208 via a bus 210. An input device 212 and a display device 214 are connected to the bus 210 via the input/output interface 208.

The computer-readable medium 204 includes a memory as a main storage device, and a storage as an auxiliary storage device. A semiconductor memory, a hard disk apparatus, a solid state drive apparatus, and the like may be applied to the computer-readable medium 204. Any combination of a plurality of apparatuses may be applied to the computer-readable medium 204.

It should be noted that the hard disk apparatus can be referred to as HDD that is an abbreviation for hard disk drive in English. The solid state drive apparatus can be referred to as SSD that is an abbreviation for solid state drive in English notation.

The control device 200 is connected to a network via the communication interface 206, and is communicably connected to an external device. A local area network (LAN) and the like may be applied to the network. It should be noted that the network is not shown.

The computer-readable medium 204 stores a transport control program 220, a printing control program 222, a measurement control program 224, a drying control program 226, and a maintenance control program 228.

The transport control program 220 corresponds to transport control applied to the transport device 164 shown in FIG. 22. The printing control program 222 corresponds to printing control applied to the printing device 106. The measurement control program 224 corresponds to measurement control applied to the measurement device 110. The drying control program 226 corresponds to drying control applied to the drying device 112. The maintenance control program 228 corresponds to maintenance control applied to the maintenance device 140.

Various programs stored in the computer-readable medium 204 include one or more commands. Various data, various parameters, and the like are stored in the computer-readable medium 204. It should be noted that the memory 176 shown in FIG. 22 is included in the computer-readable medium 204 shown in FIG. 23.

In the printing system 100, the processor 202 performs various programs stored in the computer-readable medium 204 to realize various functions in the printing system 100. It should be noted that the term “program” is synonymous with the term “software”.

The control device 200 communicates data to and from an external device via the communication interface 206. Various standards, such as universal serial bus (USB), may be applied to the communication interface 206. Either wired communication or wireless communication may be applied to a communication form of the communication interface 206.

The control device 200 is connected to the input device 212 and the display device 214 via the input/output interface 208. An input device, such as a keyboard and a mouse, is applied to the input device 212. The display device 214 displays various information applied to the control device 200.

A liquid crystal display, an organic EL display, a projector, or the like may be applied to the display device 214. Any combination of a plurality of devices may be applied to the display device 214. It should be noted that EL of the organic EL display is an abbreviation for electro-luminescence.

Here, examples of the hardware structure of the processor 202 include a CPU, a GPU, a programmable logic device (PLD), and an application specific integrated circuit (ASIC). The CPU is a general-purpose processor that performs the program and acts as various functional units. The GPU is a processor specialized in the image processing.

The PLD is a processor in which a configuration of an electric circuit can be changed after manufacturing the device. Examples of the PLD include a field programmable gate array (FPGA). The ASIC is a processor comprising a dedicated electric circuit specifically designed to execute specific processing.

One processing unit may be configured by one of these various processors or may be configured by two or more processors of the same type or different types. Examples of a combination of the various processors include a combination of one or more FPGAs and one or more CPUs, and a combination of one or more FPGAs and one or more GPUs. As another example of the combination of the various processors, there is a combination of one or more CPUs and one or more GPUs.

A plurality of functional units may be configured by using one processor. As an example in which the plurality of functional units are configured by using one processor, there is an aspect in which one processor is configured by applying a combination of one or more CPUs and software, such as system on a chip (SoC) represented by the computer, such as a client or a server, and this processor is made to act as the plurality of functional units.

As another example in which the plurality of functional units are configured by using one processor, there is an aspect in which a processor that implements the functions of the entire system including the plurality of functional units by using one IC chip is used. It should be noted that IC is an abbreviation for an integrated circuit.

As described above, various functional units are configured by using one or more of the various processors described above as the hardware structure. Further, the hardware structure of these various processors is, more specifically, an electric circuit (circuitry) in which circuit elements, such as semiconductor elements, are combined.

The computer-readable medium 204 may include a semiconductor element, such as a read only memory (ROM) or a random access memory (RAM). The computer-readable medium 204 can include a magnetic storage medium, such as a hard disk. The computer-readable medium 204 can include a plurality of types of storage media.

In the embodiments of the present invention described above, the configuration elements can be changed, added, or deleted as appropriate without departing from the spirit of the present invention. The present invention is not limited to the embodiments described above, and various modifications can be made by those having ordinary knowledge in the field within the technical idea of the present invention.

EXPLANATION OF REFERENCES

1: nozzle surface
2: liquid jet head
3: lower end
4: seal blade
5: side surface
10: cap device
11: frame
12: upper surface
14: opening
15: seal blade
15A: distal end
16: moisturizing solution reservoir
20: liquid jet head
20A: side surface
20B: seal position
20C: lower surface
20D: nozzle surface
20E: protruding portion
22: head module
24: head holding housing
24A: pressing unit
30: seal blade moving mechanism
30A: seal blade moving mechanism
30B: seal blade moving mechanism
32: seal blade support member
34: swing member
34A: side surface portion
34B: front surface portion
34C: hole
36: fixing member
40: swing shaft
41: bearing
42: head abutting position
42A: head abutting surface
42C: recess portion
44: rotation shaft
46: abutting roller
48: biasing member attachment portion
50: compression spring
60: ink mist adhesion state
62: ink mist diffusion state
64: ink mist residual state
100: printing system
102: substrate supply device
104: first intermediate transport device
106: printing device
108: second intermediate transport device
110: measurement device
112: drying device
114: accumulation device
120: ink jet head
120C: ink jet head
120K: ink jet head
120M: ink jet head
120Y: ink jet head
122: printing drum
124: nozzle surface
140: maintenance device
142: head moving device
144: wiping device
144C: wiping device
144K: wiping device
144M: wiping device
144Y: wiping device
146: cap device
147C: cap
147K: cap
147M: cap
147Y: cap
148: frame
150: carriage
152: guide
154: discharge flow channel
156: discharge pump
158: discharge tank
160: system control unit
162: transport control unit
164: transport device
166: printing control unit
168: measurement control unit
170: drying control unit
172: maintenance control unit
174: information acquisition unit
176: memory
178: sensor
200: control device
202: processor
204: computer-readable medium
206: communication interface
208: input/output interface
210: bus
212: input device
214: display device
220: transport control program
222: printing control program
224: measurement control program
226: drying control program
228: maintenance control program

What is claimed is:

1. A cap device that caps a liquid jet head, the cap device comprising:

a seal member that is brought into contact with a seal position defined on a side surface of the liquid jet head; and a seal member support mechanism that supports the seal member to be movable with respect to the side surface, the seal member support mechanism including a swing member that supports the seal member to be swingable about a swing shaft along a first direction in which the seal member extends, wherein, in the swing member, a head abutting position where a lower surface of the liquid jet head, which is a surface different from a nozzle surface of the liquid jet head and faces a direction parallel to a second direction in which the nozzle surface faces, abuts is defined, and in a case in which the seal member is moved in the second direction and a fourth direction in which a normal line of the side surface faces, as the liquid jet head of which the lower surface abuts on the head abutting position moves in a third direction opposite to the second direction, the seal member is moved in the fourth direction by a distance, which is at least twice a moving distance in the second direction, and separated from the seal position.

2. The cap device according to claim 1, wherein the swing member moves the seal member in the third direction and a fifth direction opposite to the fourth direction as the liquid jet head of which the lower surface abuts on the head abutting position moves in the second direction, to bring the seal member into contact with the seal position.

3. The cap device according to claim 1, wherein the seal member support mechanism includes a biasing member that biases the swing member in the third direction.

4. The cap device according to claim 1, wherein the third direction has a component in a vertical upward direction, and a distal end of the seal member is located at a highest position in a case in which the seal member is brought into contact with the seal position.

5. The cap device according to claim 1, wherein the swing member supports at least any one of one end or the other end of the seal member in the first direction.

6. The cap device according to claim 1, wherein the seal member support mechanism includes a rotation member that is rotatably supported by the swing member, and the rotation member is disposed at a position abutting on the lower surface of the liquid jet head at the head abutting position.

7. The cap device according to claim 1, wherein the seal member support mechanism includes a plate-shaped member having an abutting surface that abuts on the lower surface of the liquid jet head at the head abutting position.

8. The cap device according to claim 7, wherein the lower surface is formed with at least any one of a protruding portion or a recess portion, and the abutting surface is formed with at least any one of a recess portion corresponding to the protruding portion formed on the lower surface or a protruding portion corresponding to the recess portion formed on the lower surface.

9. A capping method of capping a liquid jet head, the capping method comprising:

via a cap device including a seal member that is brought into contact with a seal position defined on a side surface of the liquid jet head, and a seal member support mechanism that supports the seal member to be movable with respect to the side surface, the seal member support mechanism including a swing member that supports the seal member to be swingable about a swing shaft along a first direction in which the seal member extends, in which a head abutting position where a lower surface of the liquid jet head, which is a surface different from a nozzle surface of the liquid jet head and faces a direction parallel to a second direction in which the nozzle surface faces, abuts is defined in the swing member, moving, in a case in which the seal member is moved in the second direction and a fourth direction in which a normal line of the side surface faces as the liquid jet head of which the lower surface abuts on the head abutting position moves in a third direction opposite to the second direction, the seal member in the fourth direction by a distance, which is at least twice a moving distance in the second direction, to separate the seal member from the seal position.

10. A liquid jet system comprising:

a liquid jet head; and a cap device that caps the liquid jet head, wherein the cap device includes a seal member that is brought into contact with a seal position defined on a side surface of the liquid jet head, and a seal member support mechanism that supports the seal member to be movable with respect to the side surface, the seal member support mechanism including a swing member that supports the seal member to be swingable about a swing shaft along a first direction in which the seal member extends, and in the swing member, a head abutting position where a lower surface of the liquid jet head, which is a surface different from a nozzle surface of the liquid jet head and faces a direction parallel to a second direction in which the nozzle surface faces, abuts is defined, and in a case in which the seal member is moved in the second direction and a fourth direction in which a normal line of the side surface faces, as the liquid jet head of which the lower surface abuts on the head abutting position moves in a third direction opposite to the second direction, the seal member is moved in the fourth direction by a distance, which is at least twice a moving distance in the second direction, and separated from the seal position.

11. The liquid jet system according to claim 10, further comprising:

a head lifting/lowering device that lifts and lowers the liquid jet head along the second direction and the third direction, wherein the head lifting/lowering device lifts and lowers the liquid jet head between a cap position at which the nozzle surface of the liquid jet head is moisturized and a purge position at which the liquid jet head is purged and at which a distance from the head abutting position is longer than a distance from the head abutting position at the cap position.

12. The liquid jet system according to claim 10, wherein the lower surface of the liquid jet head is located outside the nozzle surface in the first direction.

13. The liquid jet system according to claim 10, wherein the seal position is defined at a position on a third direction side with respect to the nozzle surface.

* * * * *